(12) United States Patent
Bernatz et al.

(10) Patent No.: US 8,114,310 B2
(45) Date of Patent: *Feb. 14, 2012

(54) LIQUID-CRYSTAL DISPLAY

(75) Inventors: Georg Bernatz, Darmstadt (DE);
Andreas Taugerbeck, Darmstadt (DE);
Matthias Bremer, Darmstadt (DE);
Achim Goetz, Alsbach-Haehlein (DE)

(73) Assignee: Merck Patent GmbH, Darmstadt (DE)

( * ) Notice: Subject to any disclaimer, the term of this patent is extended or adjusted under 35 U.S.C. 154(b) by 85 days.

This patent is subject to a terminal disclaimer.

(21) Appl. No.: 12/228,086

(22) Filed: May 20, 2008

(65) Prior Publication Data
US 2009/0324853 A1 Dec. 31, 2009

(30) Foreign Application Priority Data
Oct. 22, 2007 (DE) .......................... 10 2007 050 262

(51) Int. Cl.
C09K 19/00 (2006.01)
C09K 19/06 (2006.01)
C09K 19/52 (2006.01)
G02F 1/1333 (2006.01)

(52) U.S. Cl. ........... 252/299.6; 252/299.01; 252/299.62; 430/20; 428/1.1; 428/1.3; 428/349; 428/86

(58) Field of Classification Search .............. 252/299.01, 252/299.1, 299.6, 299.62; 430/20; 428/1.1, 428/1.3; 349/86
See application file for complete search history.

(56) References Cited

U.S. PATENT DOCUMENTS

| | | | |
|---|---|---|---|
| 5,382,379 A | 1/1995 | Onji et al. | |
| 6,177,972 B1 | 1/2001 | Held et al. | |
| 6,287,650 B1 | 9/2001 | Pauluth et al. | |
| 6,511,720 B2 | 1/2003 | Pauluth et al. | |
| 6,740,369 B2 | 5/2004 | Klasen-Memmer et al. | |
| 6,861,107 B2 | 3/2005 | Klasen-Memmer et al. | |
| 7,514,514 B2 | 4/2009 | Buchecker et al. | |
| 7,731,865 B2 | 6/2010 | Bernatz et al. | |
| 7,754,103 B2 | 7/2010 | Manabe et al. | |
| 2004/0138394 A1 | 7/2004 | Buchecker et al. | |
| 2004/0191428 A1 | 9/2004 | Tsuda et al. | |
| 2009/0103011 A1* | 4/2009 | Bernatz et al. ................. 349/86 |
| 2009/0109392 A1 | 4/2009 | Hsieh et al. | |

FOREIGN PATENT DOCUMENTS

| | | |
|---|---|---|
| DE | 102 29 828 | 2/2003 |
| DE | 10 2005 027 763 | 1/2006 |
| DE | 10 2005 024 400 | 11/2006 |
| EP | 0 272 580 | 6/1988 |
| EP | 0272580 | 6/1988 |
| EP | 1 219 651 | 7/2002 |
| EP | 1219651 | 7/2002 |
| EP | 1 378 557 | 1/2004 |
| EP | 1378557 | 1/2004 |
| EP | 1 498 468 | 1/2005 |
| EP | 1498468 | 1/2005 |
| EP | 1 559 745 | 8/2005 |
| EP | 1559745 | 8/2005 |
| EP | 1 626 079 | 2/2006 |
| EP | 1 627 905 | 2/2006 |
| EP | 1626079 | 2/2006 |
| EP | 1627905 | 2/2006 |
| GB | 2 379 931 | 3/2003 |
| JP | 10 36847 | 2/1989 |
| JP | 06-206836 | 7/1994 |
| JP | 06206836 | 7/1994 |
| JP | 08 246960 | 9/1996 |
| JP | 08245960 | 9/1996 |
| JP | 10-36847 | 2/1998 |

OTHER PUBLICATIONS

Takatus Haruyoshi et al. "Liquid Crystal Composition" Patent Abstracts of Japan, Publication No. 08-245960, Publication Date: Sep. 24, 1996, Applicant: Dainippon Ink & Chem. Inc. JP Application No. 08-002233, Filing Date: Jan. 10, 1996.
Kobayashi Hidekazu et al., "Liquid Crystal Display Device and Process for Preparing the same" Patent Abstracts of Japan, Publication No. 10-036847, Publicaiton Date: Feb. 10, 1998, Applicant: Seiko Epson Corp. JP Application No. 08-196801, Filing Date: Jul. 25, 1996.
Ogawa Shinji et al. "Flouroalkylcyclohexane Derivative" Patent Abstracts of Japan, Publication No. 06-206836, Publication Date: Jul. 26, 1994, Applicant: Dainippon Ink & Chem. Inc. JP Application No. 05-002564, Filing Date: Jan. 11, 1993.
Machine Translation of Kobayashi Hidekazu et al., Japan Publication No. 10-03684, Liquid Crystal Display Device and Process for Preparing the same, Publication Date: Feb. 10, 1998..
Abstract of EP 1 219 651, Richard Buchecker et al. "Photoactive copolymers useful as orientation layers for liquid crystals", STNEasy, Accession No. 2002:503401 CAPLUS; published Dec. 29, 2000.
Abstract of EP 272580, Roman Dabrowski et al. "Cyclohexylbenzene derivative liquid crystals, their preparation, and novel nematic compositions containing them", STNEasy, Accession No. 1989: 67032 CAPLUS; published Dec. 14, 1987.
Partial English translation of DE Application No. 102005024400 (A1), Eidenschink Rudolf et al. "New nematic liquid crystalline polymer useful e.g. as a polarizer, an optical compensator and in liquid crystal display", Publication Date: Nov. 30, 2006. Dainippon Ink & Chem Inc., "Fluoroalkylcyclohexane derivative," Patent Abstracts of Japan, Publication Date: Jul. 26, 1994; English Abstract of JP-06 206836.
Isuzu Motors Ltd., "Fuel device for gas engine," Patent Abstracts of Japan, Publication Date: Sep. 24, 1996; English Abstract of JP-08 246960.
Nematel GmbH & Co KG., "New nematic liquid crystalline polymer useful e.g. a polarizer, an optical compensator and in liquid crystal display," Espacenet, Publication Date: Nov. 30, 2006; English Abstract of DE-10 2005 024 400.
Toshiba Corp., "Method for laying floor slab of nuclear power plant building," Patent Abstract of Japan, Publication Date: Feb. 7, 1989; English Abstract of JP-10 36847.
Chemical Abstract for EP-1 219 651, Publication Date: Jul. 3, 2002, Caplus Accession No. 2002:503401, Document No. 137:63639.
Chemical Abstract for EP-0 272 580, Publication Date: Jun. 29, 1988, Caplus Accession No. 1989:67032, Document No. 110:67032.

* cited by examiner

Primary Examiner — Geraldina Visconti
(74) Attorney, Agent, or Firm — Millen, White, Zelano & Branigan, P.C.

(57) ABSTRACT

The present invention relates to a liquid-crystal (LC) display of the PSA (polymer sustained alignment) type, and to novel polymerisable compounds and novel LC media for use in PSA displays.

25 Claims, No Drawings

LIQUID-CRYSTAL DISPLAY

The present invention relates to a liquid-crystal (LC) display of the PSA (polymer sustained alignment) type, and to novel polymerisable compounds and novel LC media for use in PSA displays.

The liquid-crystal displays (LC displays) used at present are mostly those of the TN (twisted nematic) type. However, these have the disadvantage of a strong viewing-angle dependence of the contrast. In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place. Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electrical field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are desired.

A further development are the so-called PSA (polymer sustained alignment) displays. In these, a small amount (for example 0.3% by weight, typically <1% by weight) of a polymerisable compound is added to the LC medium and, after introduction into the LC cell, is polymerised or cross-linked in situ, usually by UV photopolymerisation, with an electrical voltage applied between the electrodes. The addition of polymerisable mesogenic or liquid-crystalline compounds, also known as "reactive mesogens" (RMs), to the LC mixture has proven particularly suitable. Two applications may be mentioned, the so-called PSA-VA displays and PSA-OCB displays. As can be demonstrated in test cells, the PSA method results in a pretilt in the cell. In the case of PSA-OCB displays, it is therefore possible for the bend structure to be stabilised so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays containing LC mixtures comprising polymerisable compounds or RMs are described, for example, in JP 10-036847 A, EP 1 170 626 A2, EP 1 378 557 A1, EP 1 498 468 A1, US 2004/0191428 A1, US 2006/0066793 A1 and US 2006/0103804 A1. PSA-OCB displays containing LC mixtures comprising polymerised RMs or polymers are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647.

In particular for monitor and especially TV applications, optimisation of the response times, but also of the contrast and luminance (thus also transmission), of the LC display is still desired. The PSA method appears to give crucial advantages here. In particular in the case of PSA-VA, a shortening of the response times, which correlate with a pretilt which can be measured in test cells, can be achieved without significant adverse effects on other parameters.

However, not every desired soluble RM by far is suitable for use in PSA displays, and it is often difficult to find more suitable selection criteria than the direct PSA experiment with pretilt measurement. In addition, the selected "material system" of LC mixture (also referred to below as "LC host mixture")+polymerisable component should have the lowest possible rotational viscosity and the best possible electrical properties—the so-called "voltage holding ratio" (HR or VHR) should be emphasised here. In connection with PSA-VA, a high HR after irradiation with (UV) light is, in particular, of central importance since this is a vital part of the process—but of course also occurs as "normal" loading in the finished display.

However, the problem arises that not all LC mixture+polymerisable component combinations by far "function" since, for example, an inadequate tilt or none at all arises, or since, for example, the HR is inadequate for TFT display applications. In particular, the use of low-molecular-weight compounds containing alkenyl groups as components of the LC host mixture can result in such problems. On the other hand, however, alkenyl compounds are generally desired in LC media, and also in PSA displays as components of the (unpolymerised) LC host mixture, since they facilitate low rotational viscosities and thus fast response times.

The choice becomes even smaller if polymerisation by means of UV light without the addition of photoinitiators is desired, which may be advantageous for certain applications.

There thus continues to be a great demand for PSA displays, in particular of the VA and OCB type, and LC media and polymerisable compounds for use in such displays, which do not have the disadvantages described above or only do so to a small extent and have improved properties. In particular, there is a great demand for PSA displays or materials having a high specific resistance at the same time as a large working-temperature range, short response times, even at low temperatures, and a low threshold voltage, which facilitate a large number of grey shades, high contrast and a wide viewing angle, and have high values of the voltage holding ratio (HR) after UV exposure.

The invention was based on the object of providing PSA displays which do not have the disadvantages indicated above or only do so to a lesser extent, enable the setting of a pretilt angle and preferably at the same time have very high specific resistance values, low threshold voltages and short response times.

Surprisingly, it has now been found that this object can be achieved by using PSA displays according to the invention in which the polymerisable component of the LC medium (RM) consists of compounds containing methacrylate groups, and the low-molecular-weight component ("LC host mixture") comprises one or more alkenyl compounds. It has been found that, on the one hand, very good values arise in the HR, in particular after UV exposure, and, on the other hand, very good tilt values can be achieved for LC media which comprise alkenyl compounds on use of polymerisable components containing methacrylate groups. In addition, the use of alkenyl compounds in the LC host mixture enables lower rotational viscosities and thus very short response times to be achieved in the LC mixture. This material combination is therefore particularly suitable for use in TFT-PSA-VA displays. In particular, LC host mixtures comprising various alkenyl compounds exhibit very similar, good tilts for a wide range of different specific alkenyl compounds on addition of methacrylate RMs. By contrast, the same LC host mixtures exhibit significantly poorer HR (UV) values and in addition a reduced or in some cases even totally suppressed tilt generation on addition of, for example, acrylate RMs.

The invention thus relates to a liquid-crystal (LC) display of the PSA (polymer sustained alignment) type, containing an LC cell consisting of two substrates, where at least one substrate is transparent to light and at least one substrate has an electrode layer, and a layer, located between the substrates, of an LC medium comprising a polymerised component and a low-molecular-weight component, where the polymerised component is obtainable by polymerisation of one or more polymerisable compounds between the substrates of the LC cell in the LC medium with application of an electrical voltage, characterised in that all polymerisable compounds present in the LC medium contain exclusively methacrylate group(s) as polymerisable group(s), and the low-molecular-weight component comprises one or more mesogenic or liquid-crystalline compounds containing one or more alkenyl groups which are stable to a polymerisation reaction under the conditions used for the polymerisation of the methacrylate groups.

The invention furthermore relates to an LC medium comprising one or more polymerisable methacrylate compounds and one or more alkenyl compounds as described above and below.

The invention furthermore relates to an LC medium comprising a polymerisable component A) comprising one or more polymerisable compounds, where all polymerisable compounds present in the LC medium contain exclusively methacrylate group(s) as polymerisable group(s), as described above and below, and a liquid-crystalline component B) comprising one or more, preferably two or more, low-molecular-weight (i.e. monomeric or unpolymerised) compounds, including at least one mesogenic or liquid-crystalline compound containing one or more alkenyl groups which are stable to a polymerisation reaction under the conditions used for the polymerisation of the methacrylate groups.

Particular preference is given to LC media comprising one, two or three polymerisable methacrylate compounds as described above and below.

Preference is furthermore given to achiral polymerisable methacrylate compounds and to LC media comprising, preferably exclusively consisting of, achiral compounds.

Preference is furthermore given to PSA displays and LC media in which the polymerisable component or component A) comprises one or more polymerisable compounds containing a methacrylate group (monoreactive) and one or more polymerisable compounds containing two or more, preferably two, methacrylate groups (di- or multireactive).

Preference is furthermore given to PSA displays and LC media in which the polymerisable component or component A) comprises exclusively polymerisable compounds containing two methacrylate groups (direactive).

The polymerisable compounds may be added individually to the LC media, but it is also possible to use mixtures comprising two or more polymerisable compounds according to the invention. On polymerisation of such mixtures, copolymers are formed. The invention furthermore relates to the polymerisable mixtures mentioned above and below. The polymerisable compounds are mesogenic or non-mesogenic, preferably mesogenic or liquid-crystalline.

Preference is furthermore given to LC media in which the low-molecular-weight component or component B) is an LC compound or an LC mixture which has a nematic liquid-crystal phase.

In a preferred embodiment of the invention, the polymerisable compounds are selected from formula I:

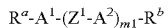

$$R^a\text{-}A^1\text{-}(Z^1\text{-}A^2)_{m1}\text{-}R^b \qquad \text{I}$$

in which the individual radicals have the following meaning:
$A^1$ and $A^2$ each, independently of one another, an aromatic, heteroaromatic, alicyclic or heterocyclic group, preferably having 4 to 25 C atoms, which may also contain fused rings, and which is optionally mono- or polysubstituted by L, $Z^1$ on each occurrence, identically or differently, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —C≡C—, —CH═CH—COO—, —OCO—CH═CH—, CR$^0$R$^{00}$ or a single bond, L, $R^a$ and $R^b$ each, independently of one another, H, halogen, SF$_5$, NO$_2$, a carbon group or hydrocarbon group, where the compounds contain at least one radical L, $R^a$ and $R^b$ which denotes or contains a group P-Sp-, $R^0$ and $R^{00}$ each, independently of one another, H or alkyl having 1 to 12 C atoms,

P CH$_2$═C(CH$_3$)—COO—,

Sp a spacer group or a single bond, m1 0, 1, 2, 3 or 4, n1 1, 2, 3 or 4.

Particularly preferred compounds of the formula I are those in which $A^1$ and $A^2$ each, independently of one another, denote 1,4-phenylene, naphthalene-1,4-diyl or naphthalene-2,6-diyl, in which, in addition, one or more CH groups in these groups may be replaced by N, cyclohexane-1,4-diyl, in which, in addition, one or more non-adjacent $CH_2$ groups may be replaced by O and/or S, 14-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P-Sp-, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl or P-Sp-, $Y^1$ denotes halogen, $R^x$ denotes P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl or P-Sp-, an optionally substituted aryl or aryloxy group having 6 to 40 C atoms, or an optionally substituted heteroaryl or heteroaryloxy group having 2 to 40 C atoms, $R^a$ and $R^b$ each, independently of one another, denote P-Sp-, H, L as defined above, or straight-chain or branched alkyl having 1 to 25 C atoms, in which, in addition, one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, where at least one of the radicals $R^a$, $R^b$ and L contains at least one group P-Sp-.

Particular preference is given to compounds of the formula I in which one or both radicals $R^a$ and $R^b$ denote P-Sp-.

Particularly preferred compounds of the formula I are selected from the following sub-formulae:

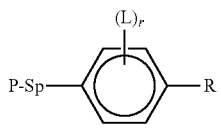
I1

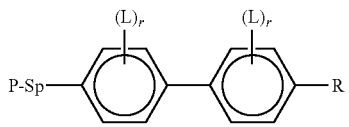
I2

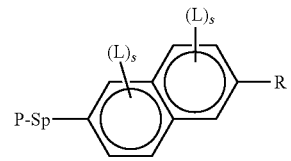
I3

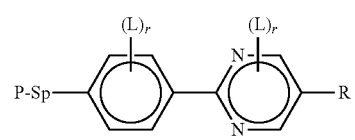
I4

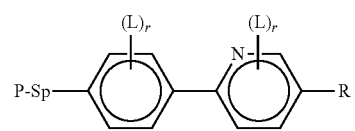
I5

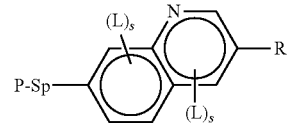
I6

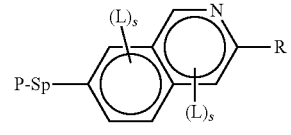
I7

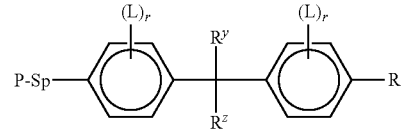
I8

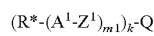
I9 in which P, Sp and L have the meaning indicated above, and L preferably denotes F or $CH_3$, R has one of the meanings indicated for $R^x$, and preferably denotes P-Sp- or straight-chain or branched alkyl or alkoxy having 1 to 12 C atoms, r denotes 0, 1, 2, 3 or 4, s denotes 0, 1, 2 or 3, and $R^y$ and $R^z$ each, independently of one another, denote H or $CH_3$.

In a further preferred embodiment of the invention, the polymerisable compounds are chiral compounds selected from formula II:

$$(R^*\text{-}(A^1\text{-}Z^1)_{m1})_k\text{-}Q \qquad \text{II}$$

in which $A^1$, $Z^1$ and m1 have on each occurrence, identically or differently, one of the meanings indicated in formula I, R* has on each occurrence, identically or differently, one of the meanings indicated for $R^a$ in formula I, Q denotes a k-valent chiral group, which is optionally mono- or polysubstituted by L, k is 1, 2, 3, 4, 5 or 6, where the compounds contain at least one radical R* or L which denotes or contains a group P-Sp- as defined above.

Particularly preferred compounds of the formula II contain a monovalent group Q of the formula III

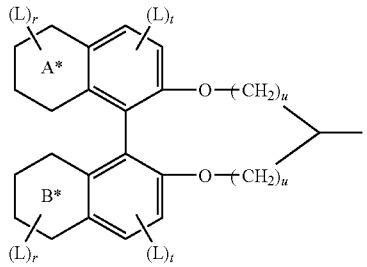

III in which L and r have on each occurrence, identically or differently, the meaning indicated above,
A* and B* each, independently of one another, denote fused benzene, cyclohexane or cyclohexene,
t on each occurrence, identically or differently, denotes 0, 1 or 2, and
u on each occurrence, identically or differently, denotes 0, 1 or 2.

Particular preference is given to groups of the formula III in which x denotes 1 or 2.

Further preferred compounds of the formula II contain a monovalent group Q or one or more groups R* of the formula IV

IV in which
$Q^1$ denotes alkylene or alkyleneoxy having 1 to 9 C atoms or a single bond,
$Q^2$ denotes optionally fluorinated alkyl or alkoxy having 1 to 10 C atoms, in which, in addition, one or two non-adjacent $CH_2$ groups may be replaced by —O—, —S—, —CH=CH—, —CO—, —OCO—, —COO—, —O—COO—, —S—CO—, —CO—S— or —C≡C— in such a way that O and/or S atoms are not linked directly to one another,
$Q^3$ denotes F, Cl, CN or alkyl or alkoxy as defined for $Q^2$, but different from 2.

Preferred groups of the formula IV are, for example, 2-butyl (=1-methylpropyl), 2-methylbutyl, 2-methylpentyl, 3-methylpentyl, 2-ethylhexyl, 2-propylpentyl, in particular 2-methyl butyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy.

Further preferred compounds of the formula II contain a divalent group Q of the formula V

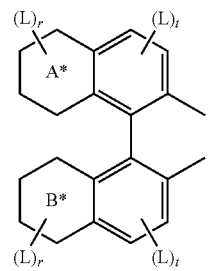

V in which L, r, t, A* and B* have the meaning indicated above.

Further preferred compounds of the formula II contain a divalent group Q selected from the following formulae:

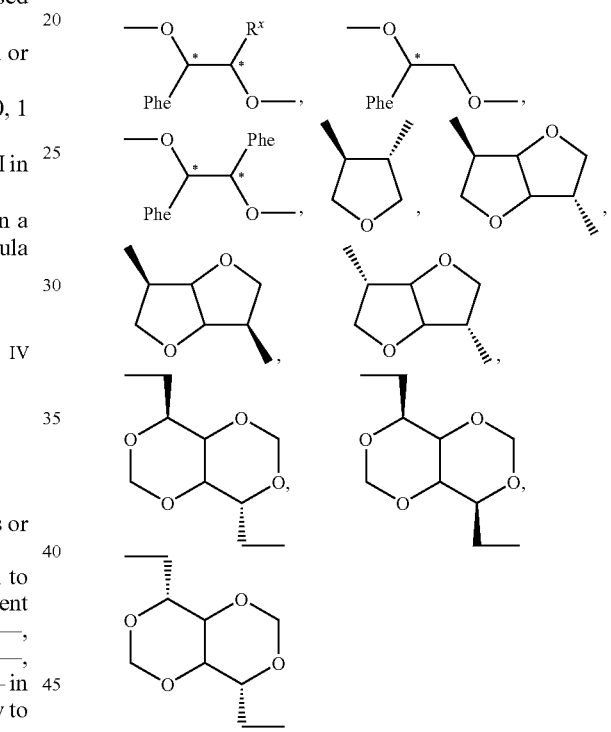

in which Phe denotes phenyl, which is optionally mono- or polysubstituted by L, and $R^x$ denotes F or optionally fluorinated alkyl having 1 to 4 C atoms.

Particularly preferred compounds of the formula II are selected from the following sub-formulae:

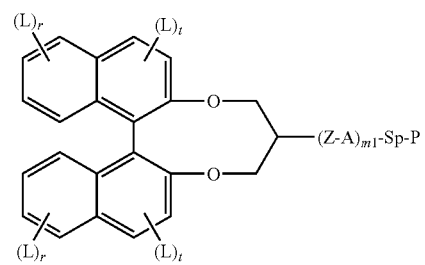

II1

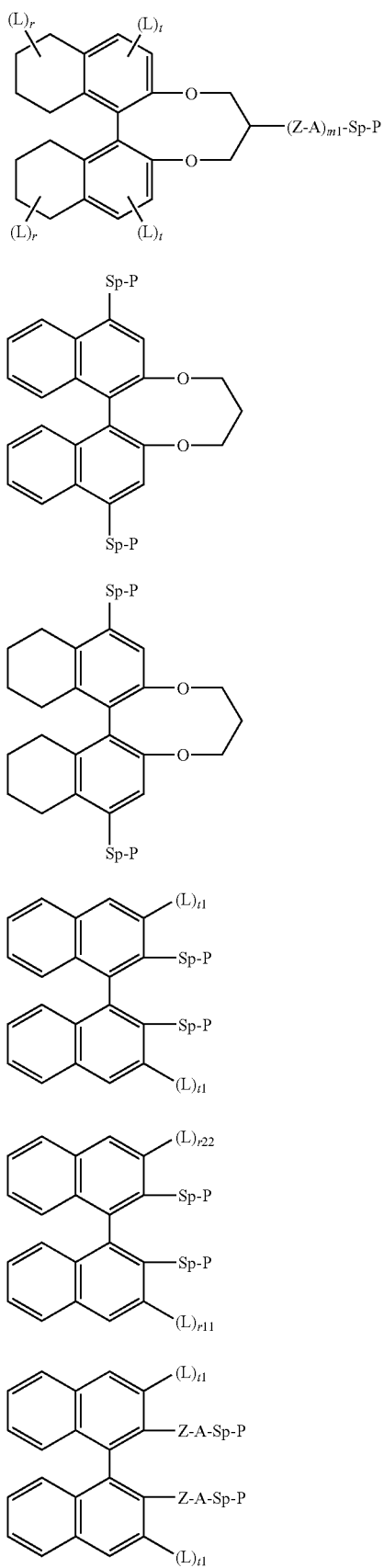

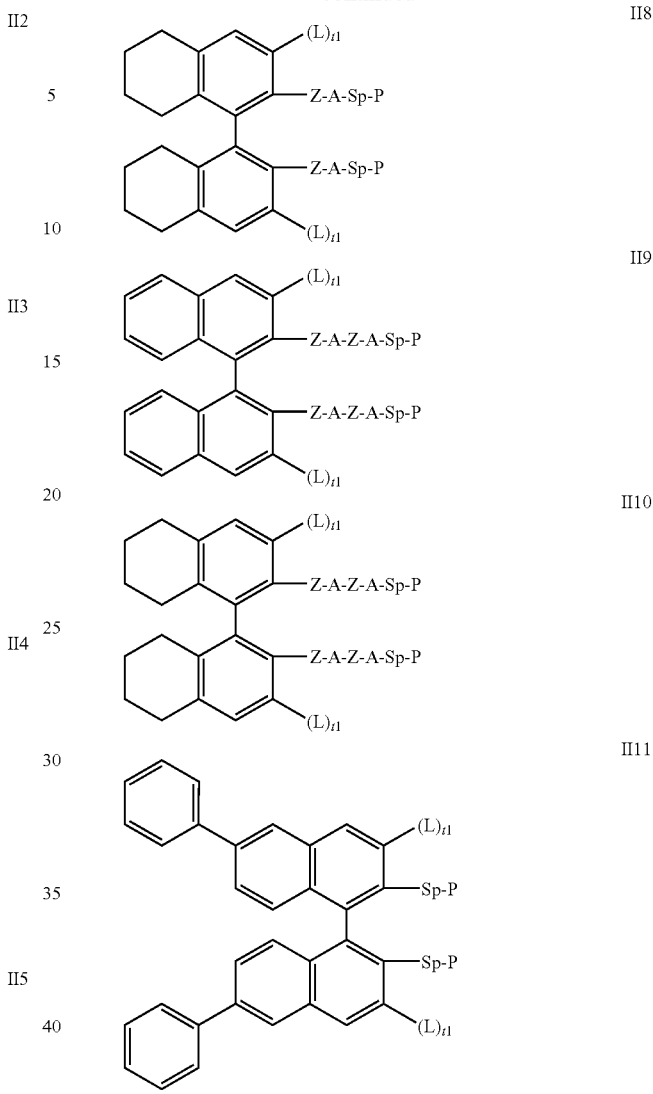

in which L, P, Sp, m1, r and t have the meaning indicated above, Z or A has on each occurrence, identically or differently, one of the meanings indicated for $Z^1$ or $A^1$ respectively, and t1 on each occurrence, identically or differently, denotes 0 or 1.

In a further preferred embodiment of the invention, the compounds of the formula I and sub-formulae thereof contain one or more branched radicals $R^a$ and/or $R^b$ and/or L containing two or more methacrylate groups (multifunctional polymerisable radicals). Suitable radicals of this type, and polymerisable compounds containing them, are described, for example, in U.S. Pat. No. 7,060,200 B1 or US 2006/0172090 A1. Particular preference is given to multifunctional polymerisable radicals selected from the following formulae:

—X-alkyl-CHP—$CH_2$—$CH_2$P      I*a

—X-alkyl-C($CH_2$P)($CH_2$P)—$CH_2$P      I*b

—X-alkyl-CHPCHP—$CH_2$P      I*c

—X-alkyl-C($CH_2$P)($CH_2$P)—$C_{aa}H_{2aa+1}$      I*d

—X-alkyl-CHP—$CH_2$P      I*e

—X-alkyl-CHPP  I*f

—X-alkyl-CPP—$C_{aa}H_{2aa+1}$  I*g

—X-alkyl-C($CH_2P$)($CH_2P$)—$CH_2OCH_2$—C($CH_2P$)($CH_2P$)$CH_2P$  I*h

—X-alkyl-CH(($CH_2$)$_{aa}$P)(($CH_2$)$_{bb}$P)  I*i

—X-alkyl-CHPCHP—$C_{aa}H_{2aa+1}$  I*k

—X'-alkyl-C($CH_3$)($CH_2P^1$)($CH_2P^2$)  I*m in which alkyl denotes a single bond or straight-chain or branched alkylene having 1 to 12 C atoms, in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where $R^x$ has the meaning indicated above and preferably denotes $R^0$ as defined above, aa and bb each, independently of one another, denote 0, 1, 2, 3, 4, 5 or 6, X has one of the meanings indicated for X', and P denotes $CH_2$=C($CH_3$)—COO—.

The following meanings apply above and below:

The term "mesogenic group" is known to the person skilled in the art and described in the literature, and denotes a group which, due to the anisotropy of its attracting and repelling interactions, essentially contributes to the formation of a liquid-crystal (LC) phase in low-molecular-weight or polymeric substances. Compounds containing mesogenic groups (mesogenic compounds) do not necessarily themselves have to have an LC phase. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below refers to a flexible group which connects the mesogenic group and the polymerisable group(s) in a polymerisable mesogenic compound ("RM") to one another.

The term "organic group" denotes a carbon or hydrocarbon group.

The term "carbon group" denotes a mono- or polyvalent organic group containing at least one carbon atom, where this either contains no further atoms (such as, for example, —C≡C—) or, if desired, contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms may be straight-chain, branched and/or cyclic, and may also contain spiro links or condensed rings.

The terms "alkyl", "aryl", "heteroaryl", etc. also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ alkyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ alkyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN, and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1'']terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno-[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups may be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent CH$_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The biaryl skeleton of the formula

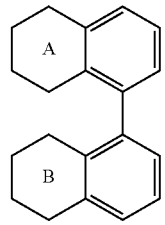

is preferably selected from the following formulae:

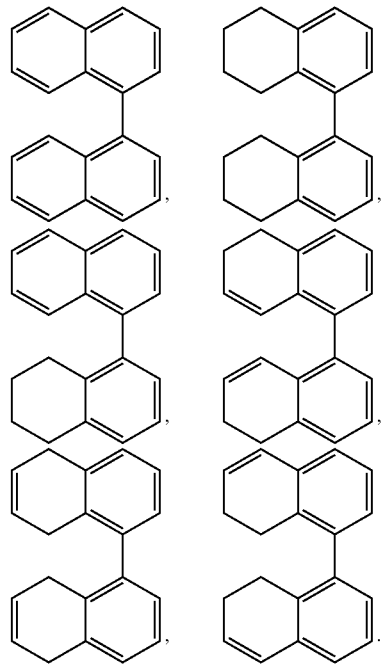

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —CN, —NO$_2$, —NCO, —NCS, —OCN, —SCN, —C(=O)N(R$^x$)$_2$, —C(=O)Y$^1$, —C(=O) R$^x$, —N(R$^x$)$_2$, in which R$^x$ has the meaning indicated above, and Y$^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the meaning indicated above.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

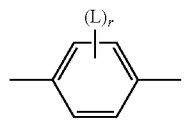

is preferably

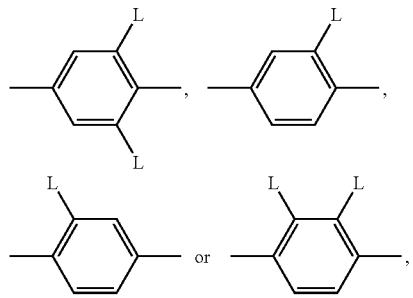

in which L has one of the meanings indicated above.

Preferred spacer groups Sp are selected from the formula Sp'-X' so that the radical "P-Sp-" corresponds to the formula "P-Sp'-X'-", where Sp' denotes alkylene having 1 to 20, preferably 1 to 12, C atoms, which is optionally mono- or polysubstituted by F, Cl, Br, I or CN, and in which, in addition, one or more non-adjacent $CH_2$ groups may each be replaced, independently of one another, by —O—, —S—, —NH—, —$NR^0$—, —$SiR^0R^{00}$—, —CO—, —COO—, —OCO—, —OCO—O—, —S—CO—, —CO—S—, —$NR^0$—CO—O—, —O—CO—$NR^0$—, —$NR^0$—CO—$NR^0$—, —CH=CH— or —C≡C— in such a way that O and/or S atoms are not linked directly to one another, X' denotes —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—COO—, —OCO—CH=CH— or a single bond, $R^0$ and $R^{00}$ each, independently of one another, denote H or alkyl having 1 to 12 C atoms, and $Y^2$ and $Y^3$ each, independently of one another, denote H, F, Cl or CN.

X' is preferably —O—, —S—, —CO—, —COO—, —OCO—, —O—COO—, —CO—$NR^0$—, —$NR^0$—CO—, —$NR^0$—CO—$NR^0$— or a single bond.

Typical spacer groups Sp' are, for example, —$(CH_2)_{p1}$—, —$(CH_2CH_2O)_{q1}$—$CH_2CH_2$—, —$CH_2CH_2$—S— $CH_2CH_2$—, —$CH_2CH_2$—NH—$CH_2CH_2$— or —$(SiR^0R^{00}$—O$)_{p1}$—, in which p1 is an integer from 1 to 12, q1 is an integer from 1 to 3, and $R^0$ and $R^{00}$ have the meanings indicated above.

Particularly preferred groups —X'-Sp'- are —$(CH_2)_{p1}$—, —O—$(CH_2)_{p1}$—, —OCO—$(CH_2)_{p1}$—, —OCOO—$(CH_2)_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Preference is furthermore given to polymerisable compounds in which Sp denotes a single bond.

The preparation of the polymerisable compounds is carried out analogously to the processes known to the person skilled in the art and described in standard works of organic chemistry, such as, for example, in Houben-Weyl, Methoden der organischen Chemie [Methods of Organic Chemistry], Thieme-Verlag, Stuttgart. The synthesis of polymerisable acrylates and methacrylates of the formula I can be carried out analogously to the methods described in U.S. Pat. No. 5,723,066. Further, particularly preferred methods are given in the examples.

In the simplest case, the synthesis is carried out by esterification or etherification of commercially available diols of the general formula HO-$A^1$-$(Z^1$-$A^2)_{m1}$-OH, in which $A^1$, $A^2$, $Z^1$ and m1 have the meanings indicated above, such as, for example, 2,6-dihydroxynaphthalene (naphthalene-2,6-diol) or 1-(4-hydroxyphenyl)phenyl-4-ol, using corresponding acids, acid derivatives, or halogenated compounds containing a group P, such as, for example, methacryloyl chloride or methacrylic acid, in the presence of a dehydrating reagent, such as, for example, DCC (dicyclohexylcarbodiimide).

The polymerisable compounds are polymerised or crosslinked in the LC medium between the substrates of the LC display with application of a voltage by in-situ polymerisation (if a compound contains two or more polymerisable groups). Suitable and preferred polymerisation methods are, for example, thermal or photopolymerisation, preferably photopolymerisation, in particular UV photopolymerisation. One or more initiators may optionally also be added here. Suitable conditions for the polymerisation, and suitable types and amounts of initiators, are known to the person skilled in the art and described in the literature. Suitable for free-radical polymerisation are, for example, the commercially available photoinitiators Irgacure651®, Irgacure184® or Darocure1173® (Ciba AG). If an initiator is employed, its proportion in the mixture as a whole is preferably 0.001 to 5% by weight, particularly preferably 0.005 to 1% by weight. However, the polymerisation can also be carried out without addition of an initiator. In a further preferred embodiment, the LC medium does not comprise a polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and described in the literature. Particularly suitable are, for example, the commercially available stabilisers from the Irganox® series (Ciba AG). If stabilisers are employed, their proportion, based on the total amount of RMs or polymerisable component A), is preferably 10-5000 ppm, particularly preferably 50-500 ppm.

The polymerisable compounds according to the invention are also suitable for polymerisation without an initiator, which is associated with considerable advantages, such as, for example, lower materials costs and in particular less contamination of the LC medium by possible residual amounts of the initiator or degradation products thereof.

The LC media according to the invention preferably comprise <5%, particularly preferably <1%, very particularly preferably <0.5%, of polymerisable compounds, in particular polymerisable compounds of the formulae mentioned above.

Besides the polymerisable compounds described above, the LC media according to the invention comprise a low-molecular-weight component. The low-molecular-weight component is preferably an LC mixture ("LC host mixture") comprising one or more, preferably two or more, low-molecular-weight (i.e. monomeric or unpolymerised) compounds, where at least one of these compounds is a mesogenic or liquid-crystalline compound containing one or more alkenyl groups ("alkenyl compound"), where these alkenyl groups are stable to a polymerisation reaction under the conditions used for the polymerisation of the methacrylate groups.

The alkenyl groups are preferably straight-chain, branched or cyclic alkenyl, in particular having 2 to 25 C atoms, particularly preferably having 2 to 12 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F and/or Cl.

Preferred alkenyl groups are straight-chain alkenyl having 2 to 7 C atoms and cyclohexenyl, in particular ethenyl, propenyl, butenyl, pentenyl, hexenyl, heptenyl, 1,4-cyclohexen-1-yl and 1,4-cyclohexen-3-yl.

In LC media for use in PSA-VA displays, the low-molecular-weight component preferably comprises one or more alkenyl compounds of the formulae A and/or B:

in which the individual radicals, on each occurrence identically or differently, each, independently of one another, have the following meaning:

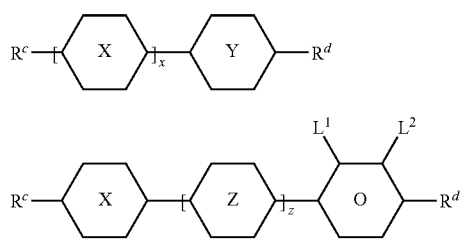

$R^c$ alkenyl having 2 to 9 C atoms or, if at least one of the rings X, Y and Z denotes cyclohexenyl, also one of the meanings of $R^d$, $R^d$ alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $L^{1-4}$ each, independently of one another, H, F, Cl, $OCF_3$, $CF_3$, $CH_3$, $CH_2F$ or $CHF_2H$, preferably H, F or Cl, x 1 or 2, z 0 or 1.

$R^d$ is preferably straight-chain alkyl or alkoxy having 1 to 8 C atoms or straight-chain alkenyl having 2 to 7 C atoms.

The LC medium preferably comprises no compounds containing a terminal vinyloxy group (—O—CH=$CH_2$), in particular no compounds of the formula A or B in which R denotes or contains a terminal vinyloxy group (—O—CH=$CH_2$).

Preferably, $L^1$ and $L^2$ denote F, or one of $L^1$ and $L^2$ denotes F and the other denotes Cl, and $L^3$ and $L^4$ denote F, or one of $L^3$ and $L^4$ denotes F and the other denotes Cl.

The compounds of the formula A are preferably selected from the following sub-formulae:

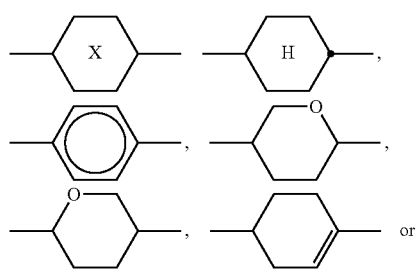

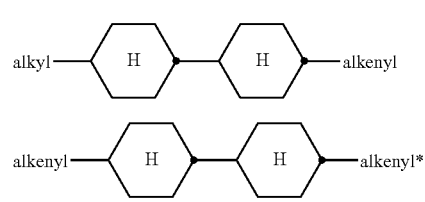

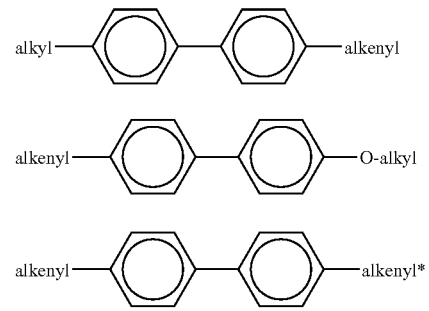
A3

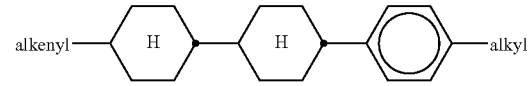
A4

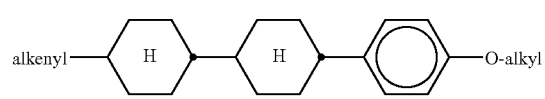
A5

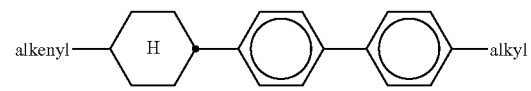
A6

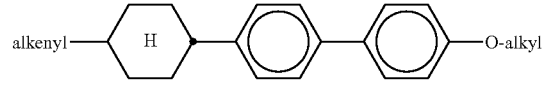
A7

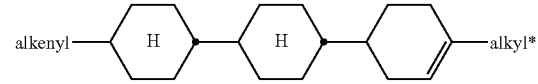
A8

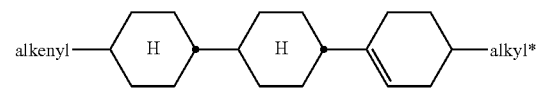
A9

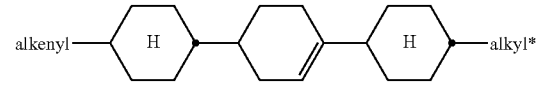
A10

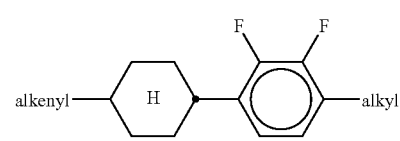
A11

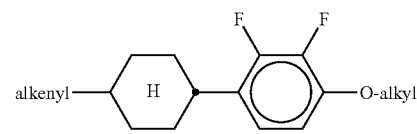
A12

The compounds of the formula B are preferably selected from the following sub-formulae:

B1

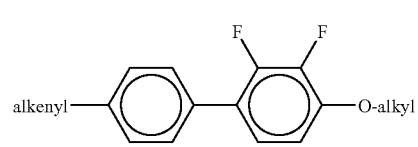
B2

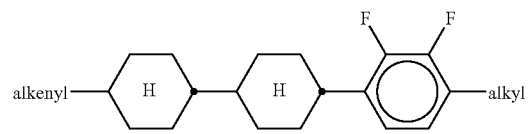
B3

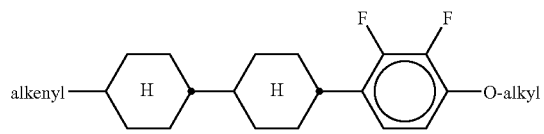
B4

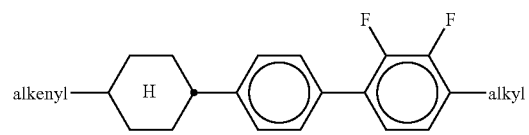
B5

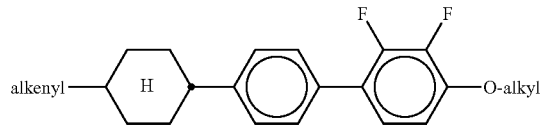
B6

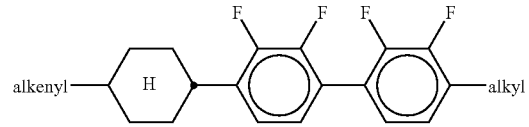
B7

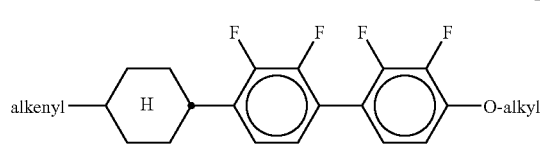
B8

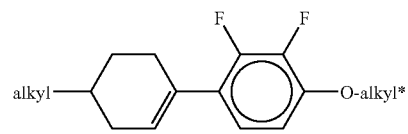
B9

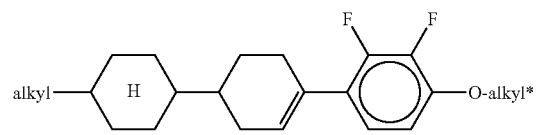
B10

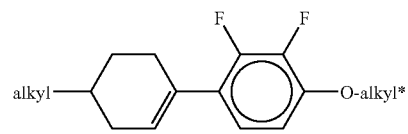
B11

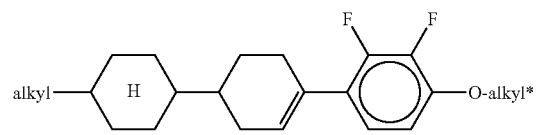
B12 in which alkyl denotes a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particularly preferred compounds of the formula A are selected from the following sub-formulae:

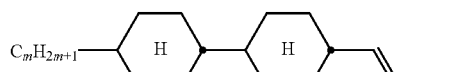
A1a

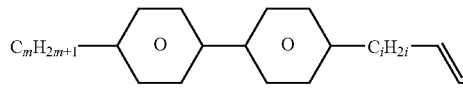
A3a

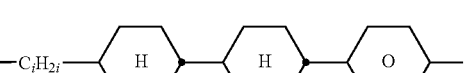
A6a

Very particularly preferred compounds of the formula B are selected from the following sub-formulae:

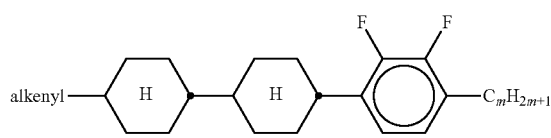
B5a

B6a

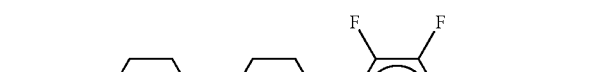
B9a

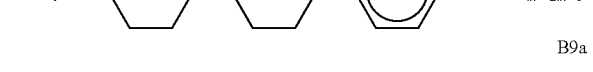
B10a

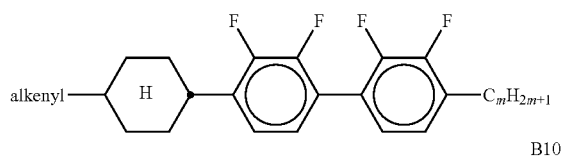
B11a

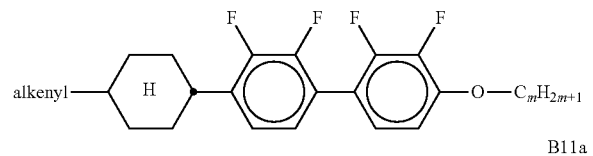
B12a

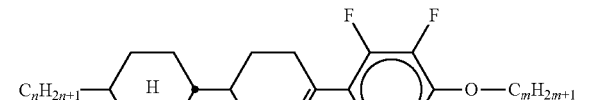

in which m and n each, independently of one another, denote 1, 2, 3, 4, 5 or 6, i denotes 0, 1, 2 or 3, $R^{b1}$ denotes H, $CH_3$ or $C_2H_5$, and alkenyl denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

In LC media for use in PSA-OCB displays, the low-molecular-weight component preferably comprises one or more alkenyl compounds of the formula A or sub-formulae thereof as defined above.

Further particularly preferred LC host mixtures and LC media are indicated below:

a) LC medium which additionally comprises one or more compounds selected from the following formulae:

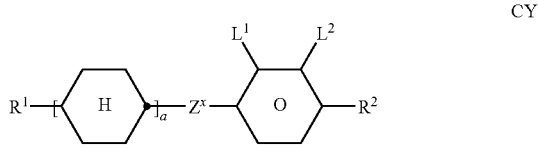
CY

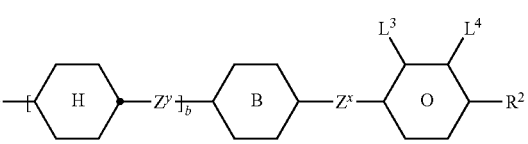
PY in which the individual radicals have the following meaning:

a 1 or 2, b 0 or 1,

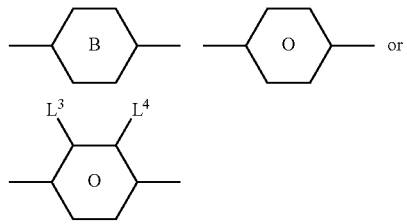

$R^1$ and $R^2$ each, independently of one another, alkyl having 1 to 12 C atoms, in which, in addition, one or two non-adjacent $CH_2$ groups may be replaced by $-O-$, $-CH=CH-$, $-CO-$, $-OCO-$ or $-COO-$ in such a way that O atoms are not linked directly to one another, $Z^x$ and $Z^y$ each, independently of one another, $-CH_2CH_2-$, $-CH=CH-$, $-CF_2O-$, $-OCF_2-$, $-CH_2O-$, $-OCH_2-$, $-COO-$, $-OCO-$, $-C_2F_4-$, $-CF=CF-$, $-CH=CHCH_2O-$ or a single bond, preferably a single bond, $L^{1-4}$ each, independently of one another, F, Cl, $OCF_3$, $CF_3$, $CH_3$, $CH_2F$, $CHF_2$.

Preferably, both radicals $L^1$ and $L^2$ denote F, or one of the radicals $L^1$ and $L^2$ denotes F and the other denotes Cl, or both radicals $L^3$ and $L^4$ denote F, or one of the radicals $L^3$ and $L^4$ denotes F and the other denotes Cl.

The compounds of the formula CY are preferably selected from the following sub-formulae:

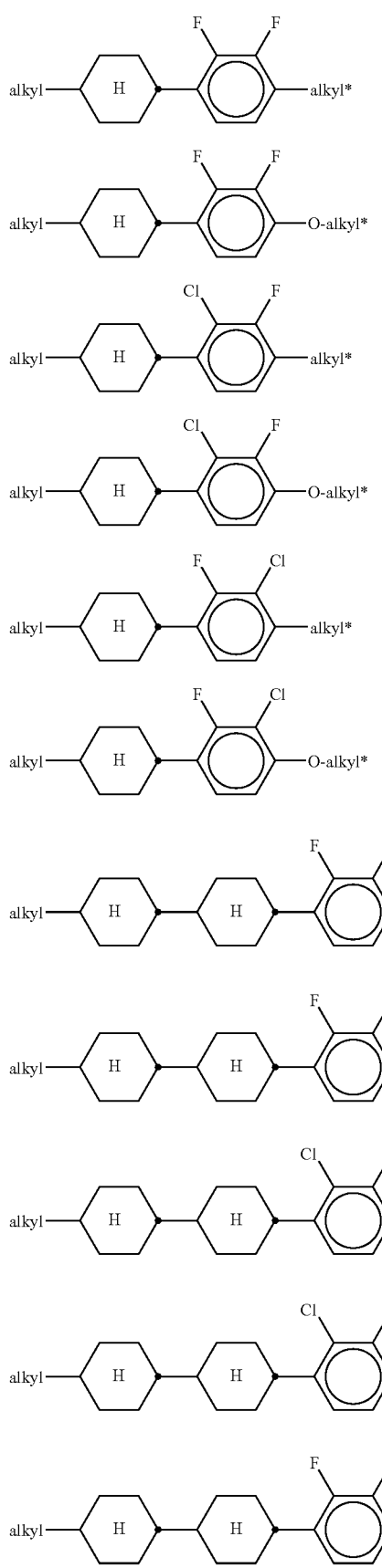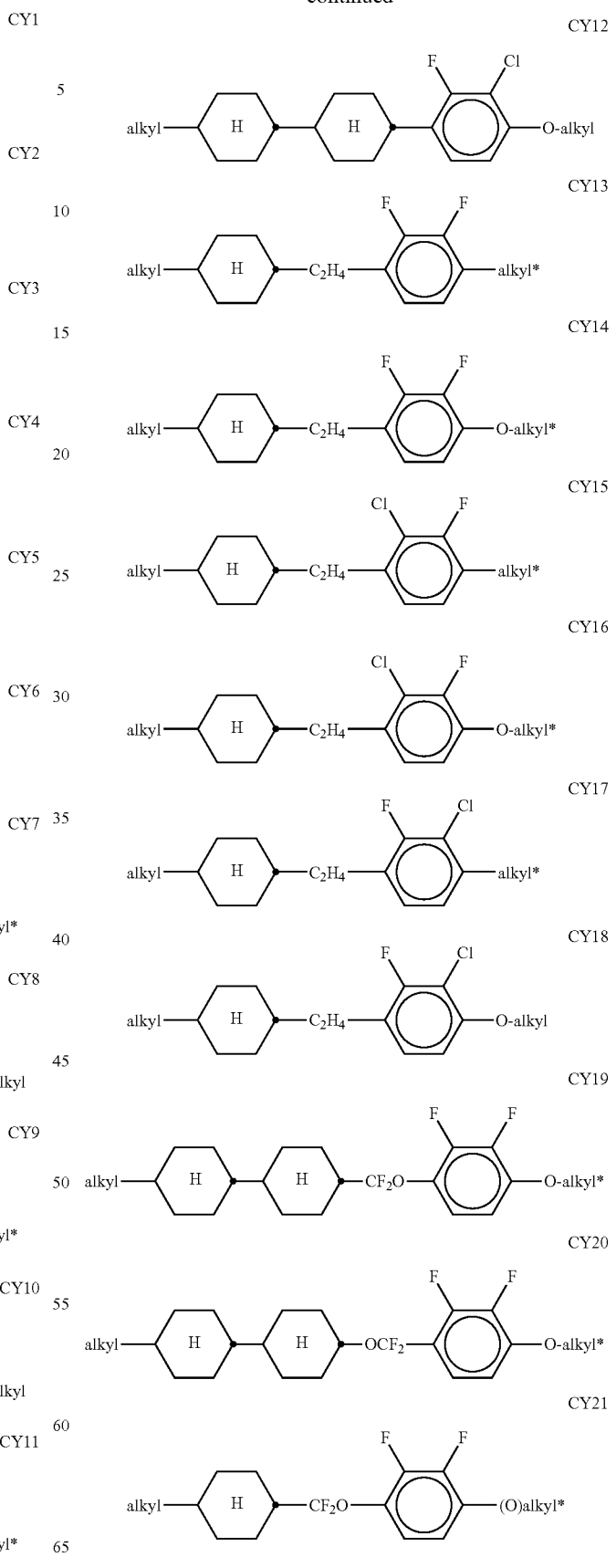

in which a denotes 1 or 2, and alkyl and alkyl* each, independently of one another, denote a straight-chain alkyl radical having 1-6 C atoms.

The compounds of the formula PY are preferably selected from the following sub-formulae:

-continued

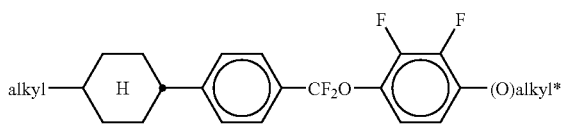
PY16 in which alkyl and alkyl* each, independently of one another, denote a straight-chain alkyl radical having 1-6 C atoms.

b) LC medium which additionally comprises one or more compounds of the following formula:

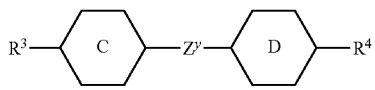
ZK in which the individual radicals have the following meaning:

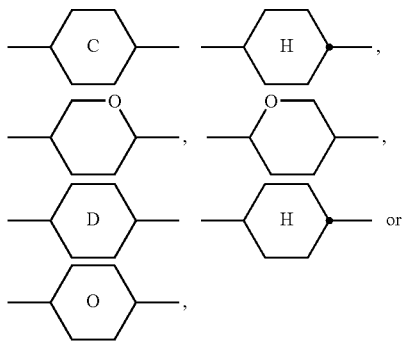

R³ and R⁴ each, independently of one another, alkyl having 1 to 12 C atoms, in which, in addition, one or two non-adjacent CH₂ groups may be replaced by —O—, —CH=CH—, —CO—, —OCO— or —COO— in such a way that O atoms are not linked directly to one another, Z$^y$ —CH₂CH₂—, —CH=CH—, —CF₂O—, —OCF₂—, —CH₂O—, —OCH₂—, —COO—, —OCO—, —C₂F₄—, —CF=CF—, —CH=CHCH₂O— or a single bond, preferably a single bond.

The compounds of the formula ZK are preferably selected from the following sub-formulae:

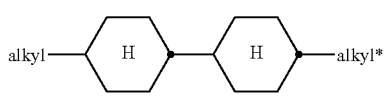
ZK1

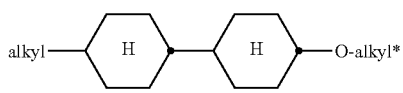
ZK2

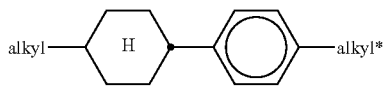
ZK3

-continued

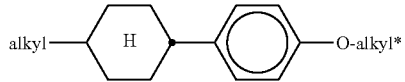
ZK4

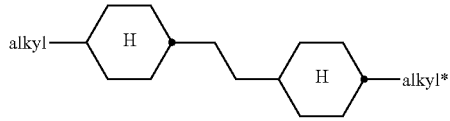
ZK5

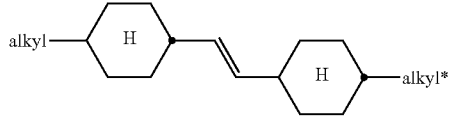
ZK6 in which alkyl and alkyl* each, independently of one another, denote a straight-chain alkyl radical having 1-6 C atoms c) LC medium which additionally comprises one or more compounds of the following formula:

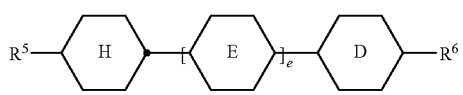
DK in which the individual radicals have on each occurrence, identically or differently, the following meaning:

R⁵ and R⁶ each, independently of one another, one of the meanings indicated above for R¹,

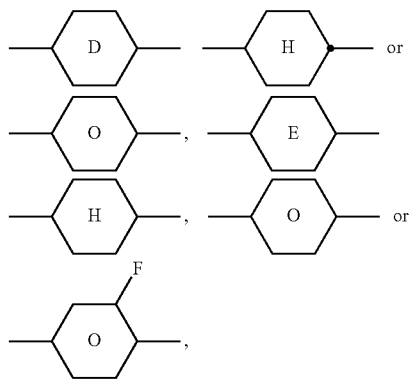

and e 1 or 2.

The compounds of the formula DK are preferably selected from the following sub-formulae.

DK1

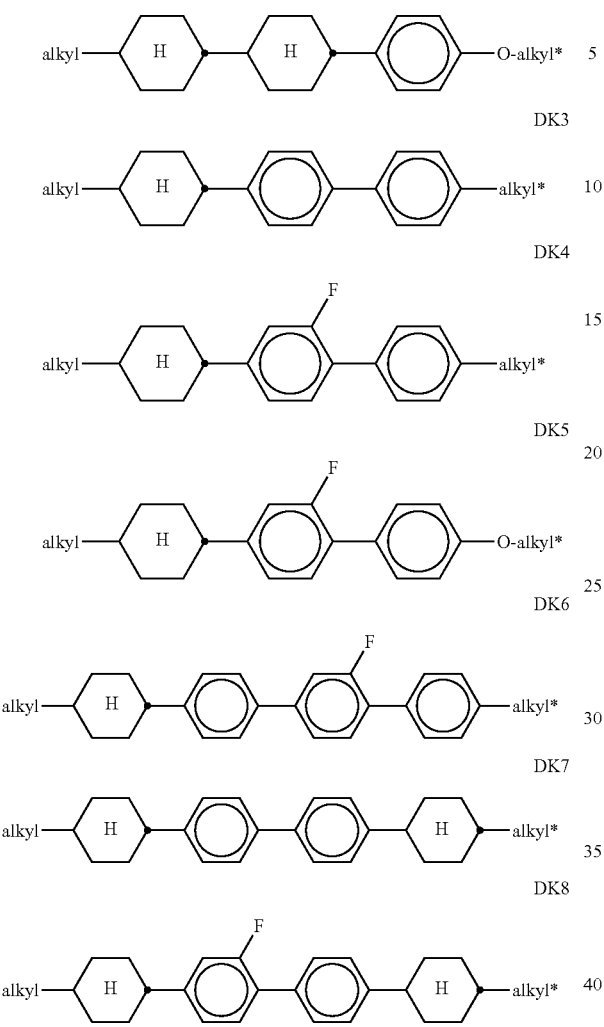

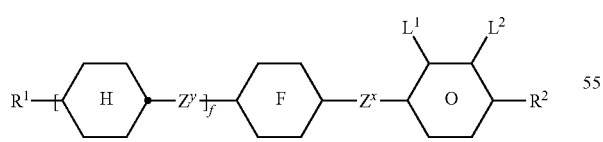

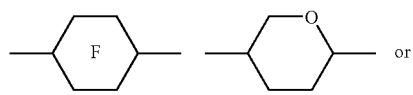

in which alkyl and alkyl* each, independently of one another, denote a straight-chain alkyl radical having 1-6 C atoms.

d) LC medium which additionally comprises one or more compounds of the following formula:

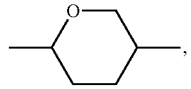

in which the individual radicals have the following meaning:

f 0 or 1, $R^1$ and $R^2$ each, independently of one another, alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^x$ and $Z^y$ each, independently of one another, —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=$CHCH_2O$—, or a single bond, preferably a single bond, $L^1$ and $L^2$ each, independently of one another, F, Cl, $OCF_3$, $CF_3$, $CH_3$, $CH_2F$, $CHF_2$.

Preferably, both radicals $L^1$ and $L^2$ denote F, or one of the radicals $L^1$ and $L^2$ denotes F and the other denotes Cl.

The compounds of the formula AY are preferably selected from the following sub-formulae:

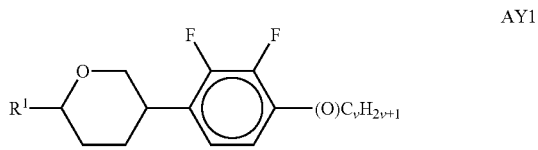

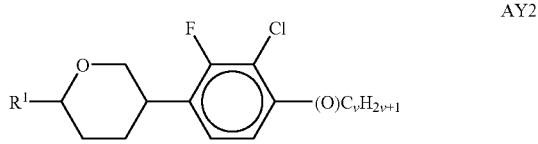

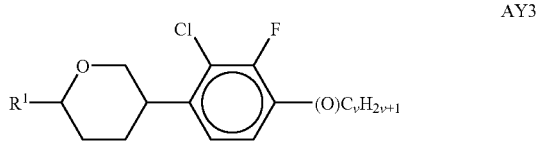

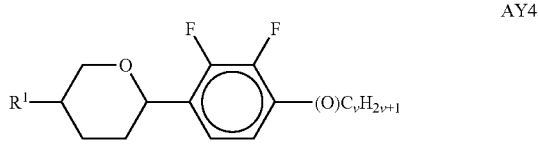

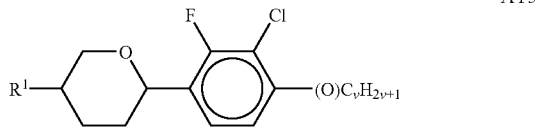

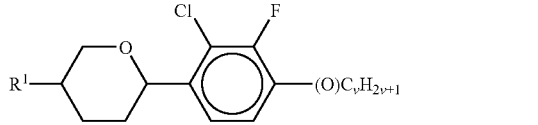

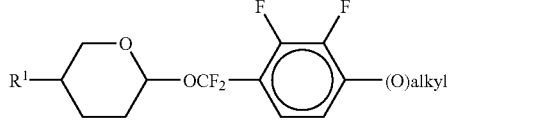

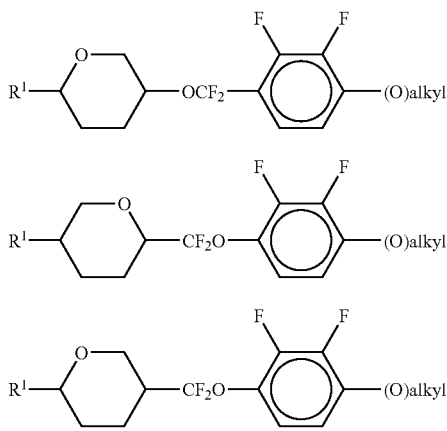

AY8
AY9
AY10 in which R¹ has the meaning indicated above, and v denotes an integer from 1 to 6. R¹ preferably denotes straight-chain alkyl, in particular $CH_3$, $C_2H_5$, n-$C_3H_7$, n-$C_4H_9$, n-$C_5H_{11}$.

e) LC medium which additionally comprises one or more compounds selected from the following formulae:

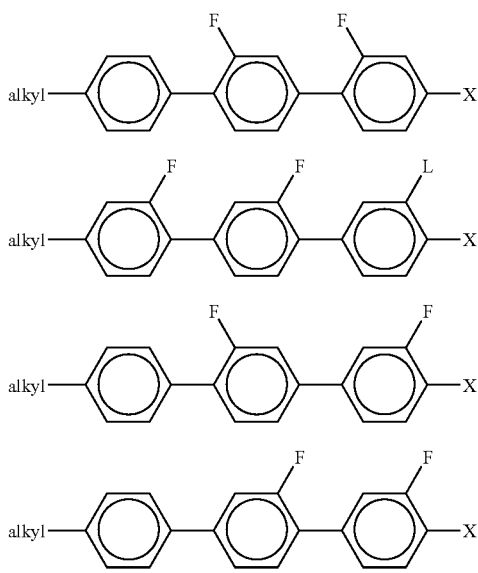

G1
G1
G3
G4 in which alkyl denotes $C_{1-6}$-alkyl, L denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the following formulae:

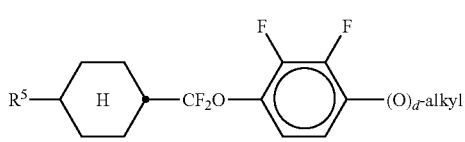

Y1

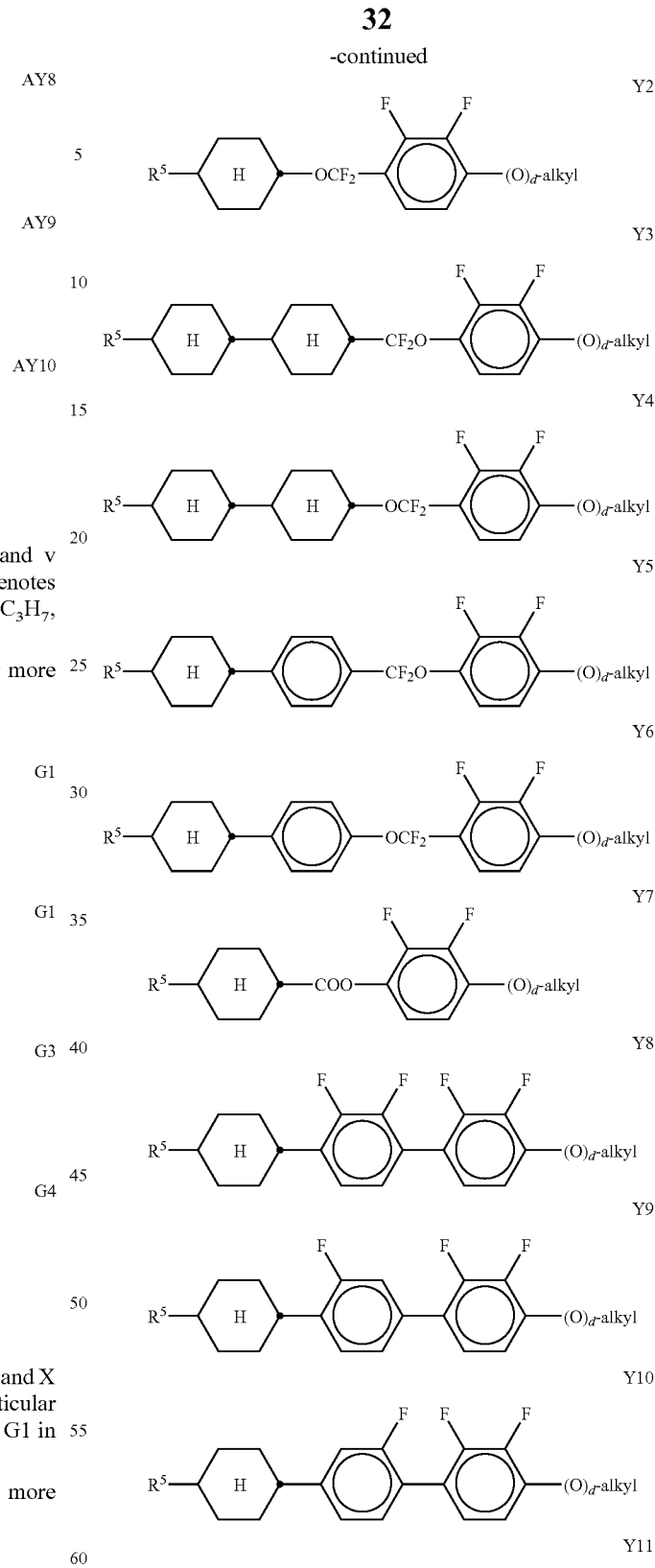

Y2
Y3
Y4
Y5
Y6
Y7
Y8
Y9
Y10
Y11

-continued

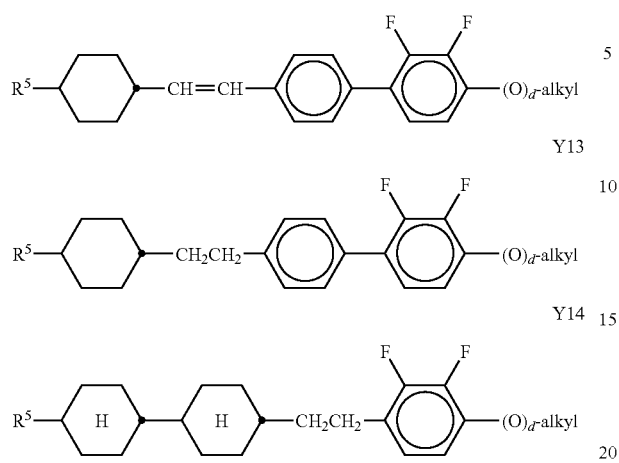

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy, d is preferably 1. The LC medium according to the invention preferably comprises one or more compounds of the above-mentioned formulae in amounts of $\geq 5\%$ by weight.

g) LC medium which additionally comprises one or more biphenyl compounds of the following formula:

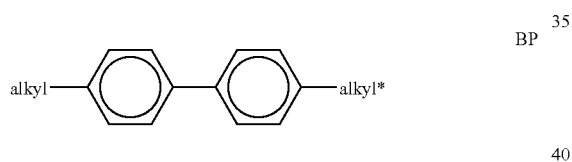

in which alkyl and alkyl each, independently of one another, denote a straight-chain alkyl radical having 1-6 C atoms.

h) LC medium which additionally comprises one or more terphenyl compounds of the following formula:

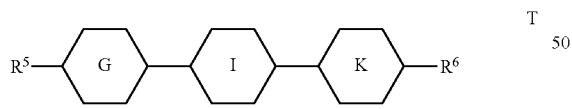

in which $R^5$ and $R^6$ each, independently of one another, have one of the meanings indicated above for $R^1$, and

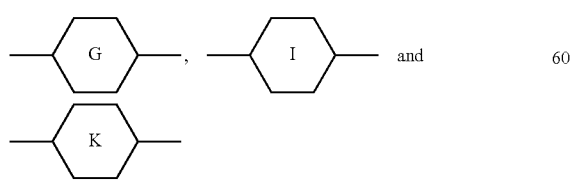

each, independently of one another, denote

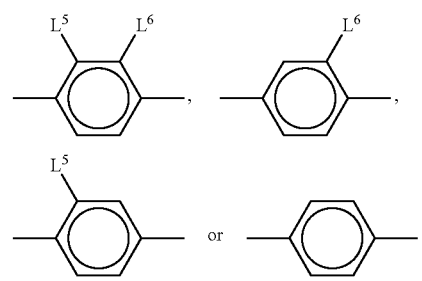

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the following sub-formulae:

T1
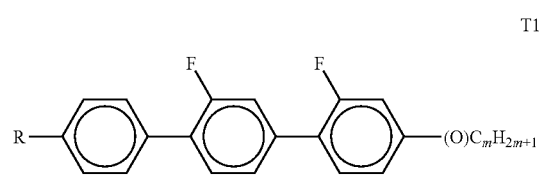

T2
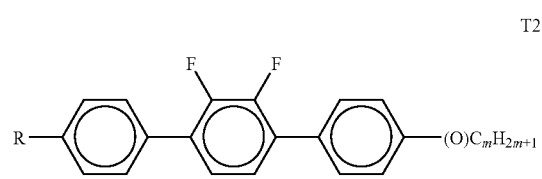

T3
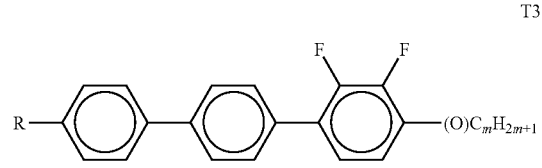

T4
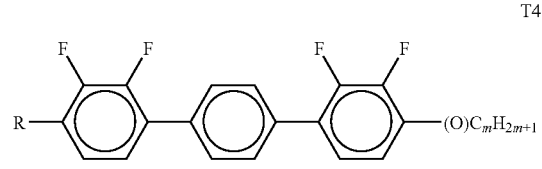

T5
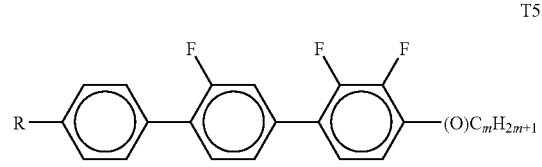

T6
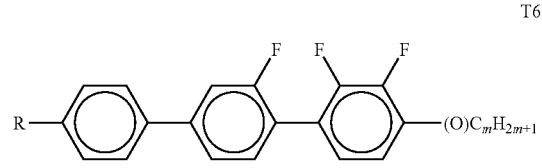

T7
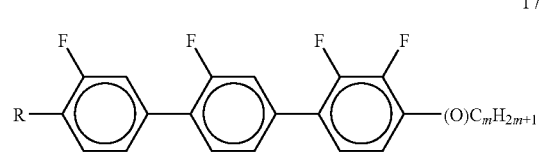

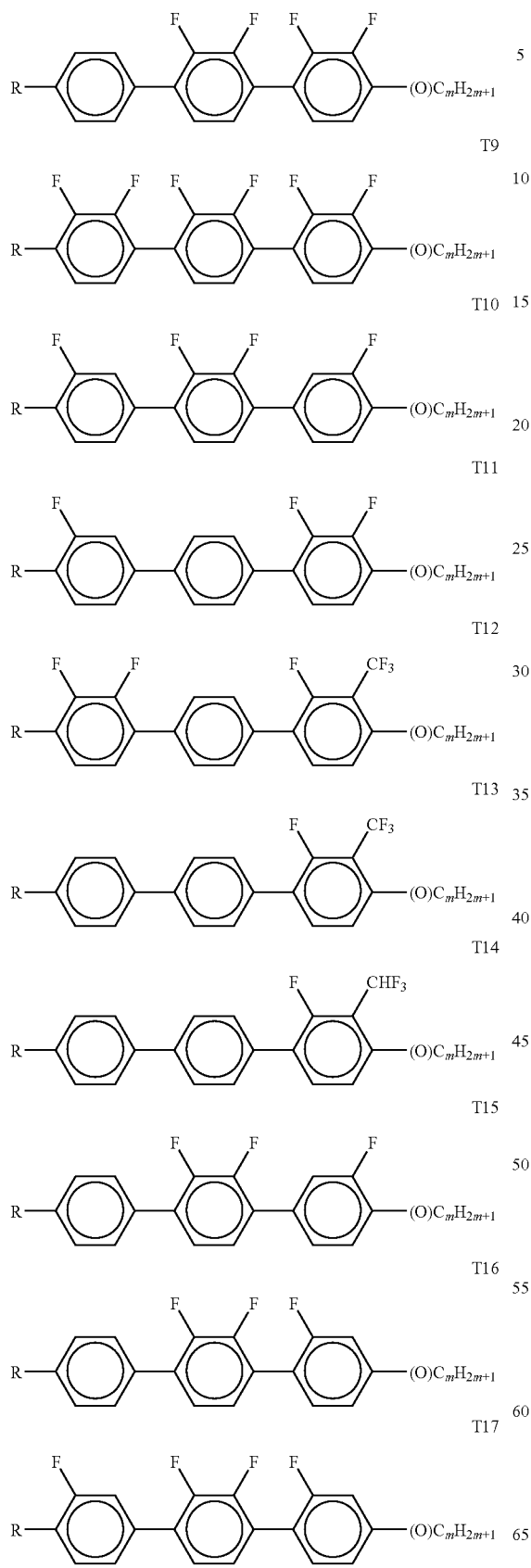
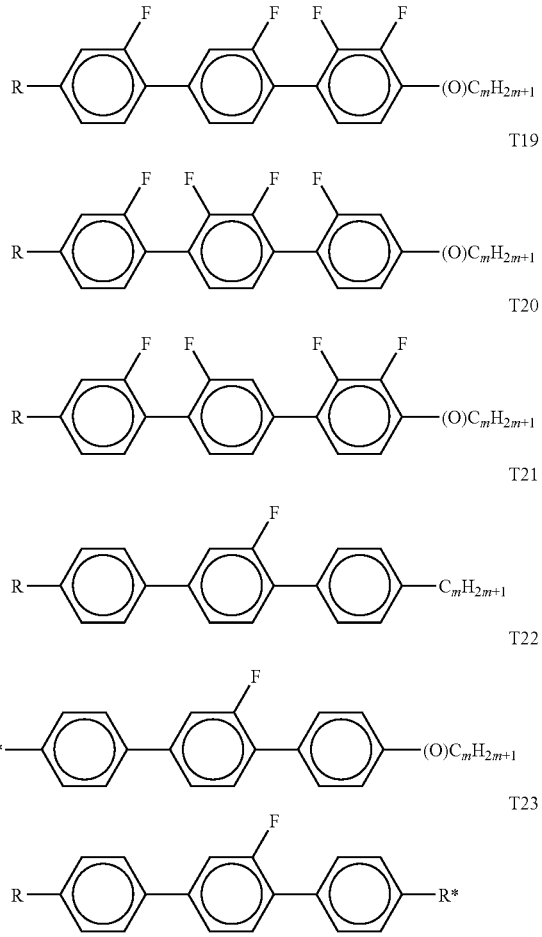

in which R denotes a straight-chain alkyl or alkoxy radical having 1-7 C atoms, R* denotes a straight-chain alkenyl radical having 2-7 C atoms, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and preferred sub-formulae thereof in an amount of 2-30% by weight, in particular 5-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≧0.1. Preferred mixtures comprise 2-20% by weight of one or more terphenyl compounds of the formula T, preferably selected from the group of the compounds T1 to T22.

i) LC medium which additionally comprises one or more compounds of the following formulae:

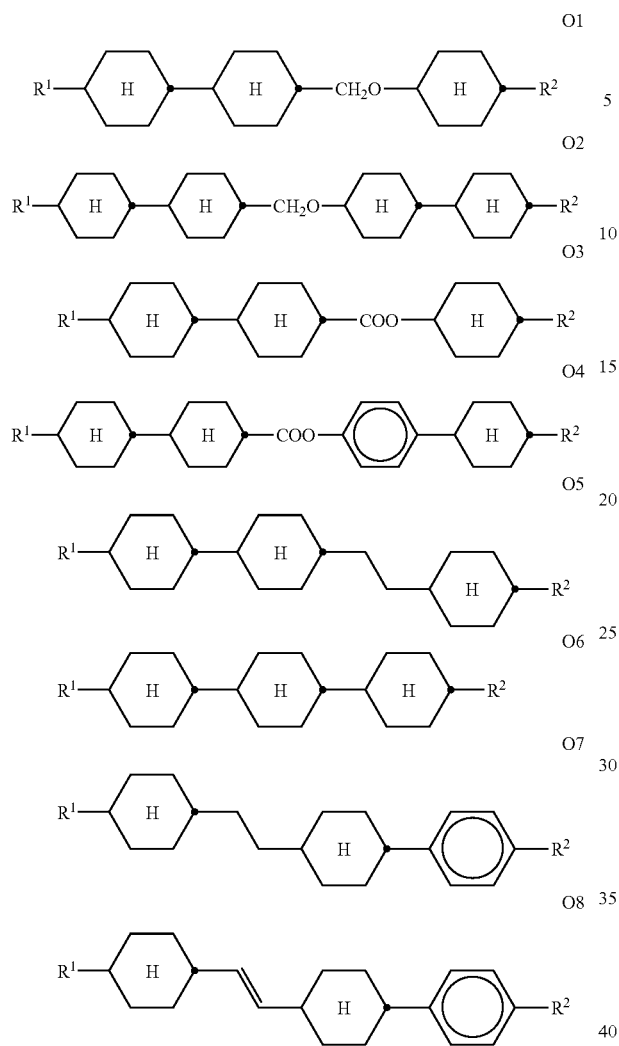

in which $R^1$ and $R^2$ have the meanings indicated above and preferably each, independently of one another, denote straight-chain alkyl or alkoxy.

Preferred media comprise one or more compounds selected from the formulae O1, O3 and O4.

k) LC medium which additionally comprises one or more compounds of the following formula:

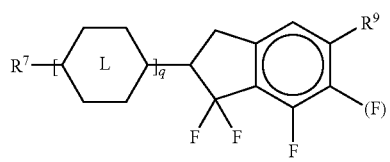

in which

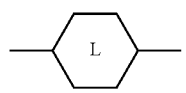

denotes

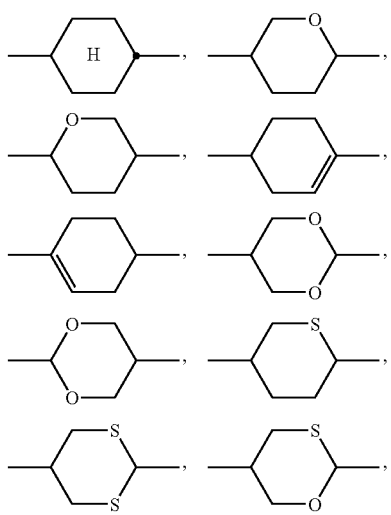

$R^9$ denotes H, CH$_3$, C$_2$H$_5$ or n-C$_3$H$_7$, and q denotes 1, 2 or 3, and $R^7$ has one of the meanings indicated for $R^1$, preferably in amounts of >3% by weight, in particular ≧5% by weight and very particularly preferably 5-30% by weight.

Particularly preferred compounds of the formula IF are selected from the following sub-formulae:

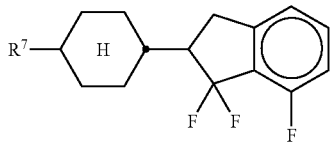

FI1

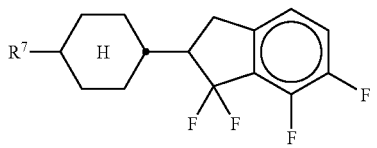

FI2

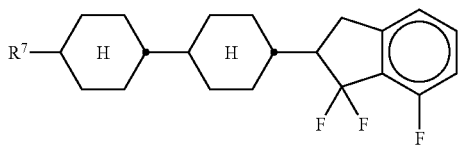

FI3

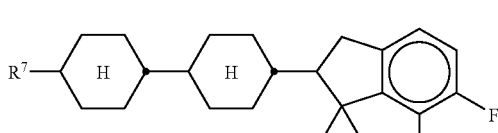

FI4

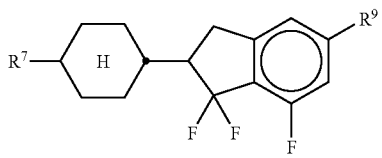

FI5

-continued

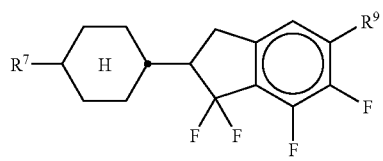
FI6

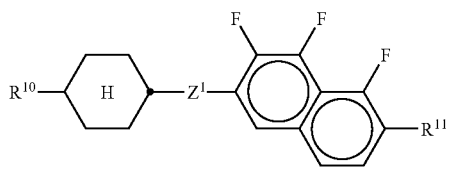
N1

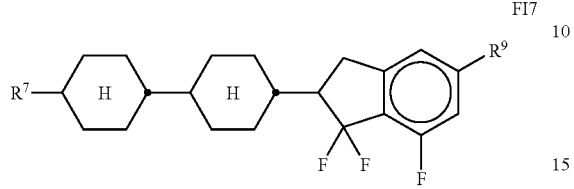
FI7

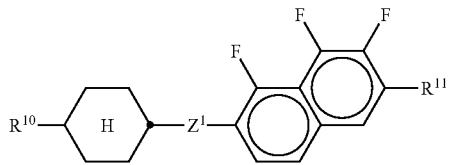
N2

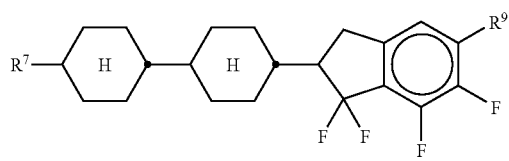
FI8

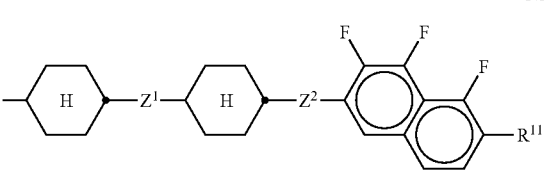
N3 in which $R^7$ preferably denotes straight-chain alkyl, and $R^9$ denotes $CH_3$, $C_2H_5$ or $n-C_3H_7$. Particular preference is given to the compounds of the formulae FI1, FI2 and FI3.

m) LC medium which additionally comprises one or more compounds of the following formulae:

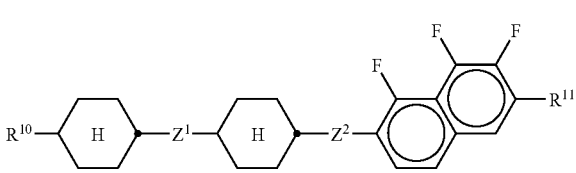
N4

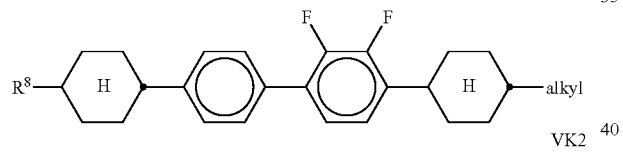
VK1

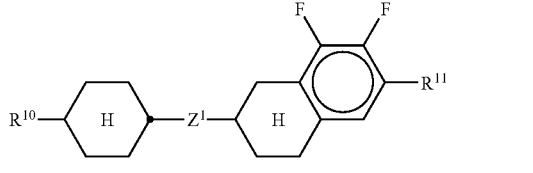
N5

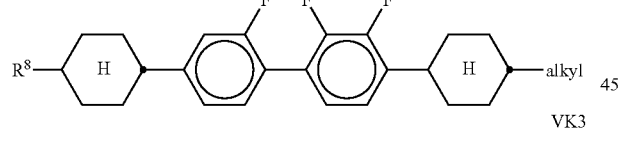
VK2

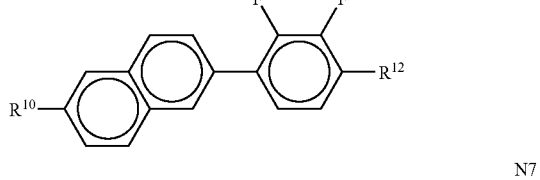
N6

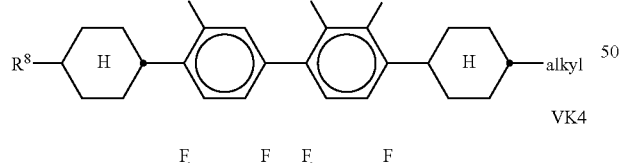
VK3

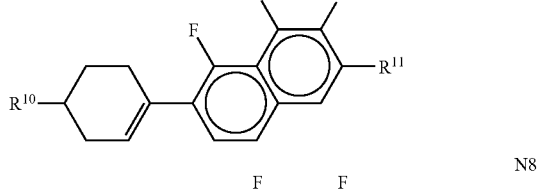
N7

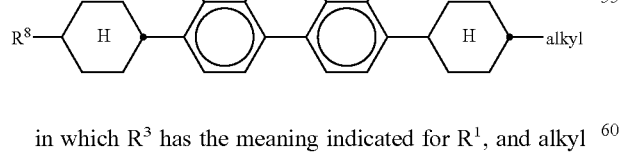
VK4

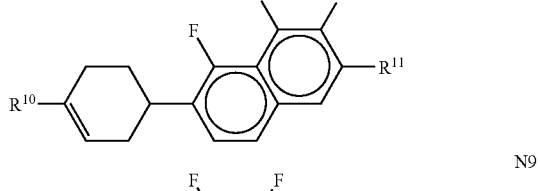
N8 in which $R^3$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the following formulae:

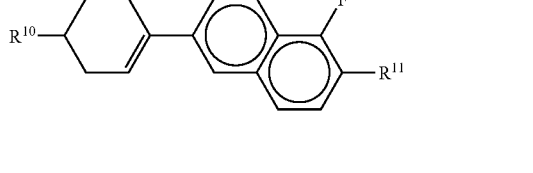
N9

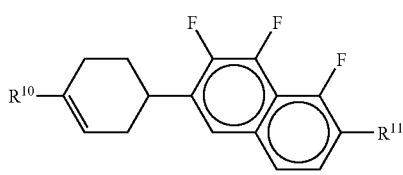
N10 in which $R^{10}$ and $R^{11}$ each, independently of one another, have one of the meanings indicated for $R^1$, preferably denote straight-chain alkyl, straight-chain alkoxy or straight-chain alkenyl, and Z, $Z^1$ and $Z^2$ each, independently of one another, denote —$C_2H_4$—, —CH=CH—, —$(CH_2)_4$—, —$(CH_2)_3O$—, —$O(CH_2)_3$—, —CH—CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

o) LC medium which additionally comprises one or more difluorodibenzochromans and/or chromans of the following formulae:

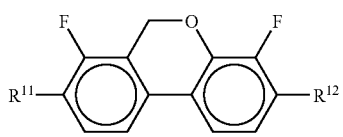
BC

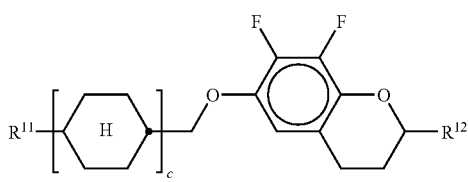
CR in which $R^{11}$ and $R^{12}$ each, independently of one another, have the meaning indicated above, and c denotes 0 or 1, preferably in amounts of 3 to 20% by weight, in particular in amounts of 3 to 15% by weight.

Particularly preferred compounds of the formulae BC and CR are selected from the following sub-formulae:

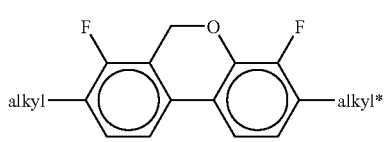
BC1

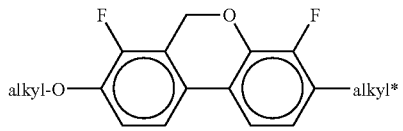
BC2

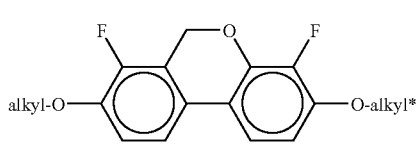
BC3

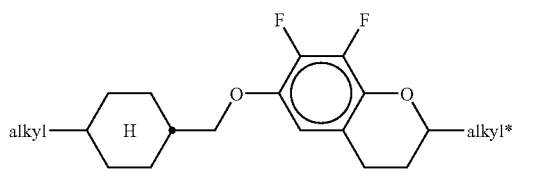
BC4

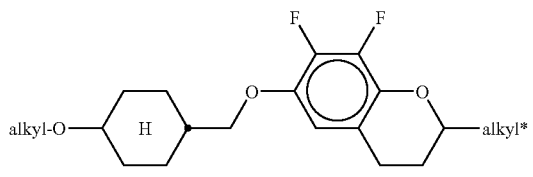
BC5

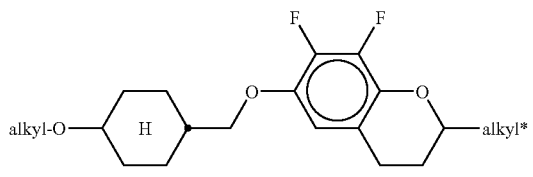
BC6

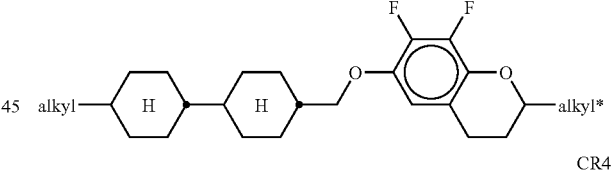
BC7

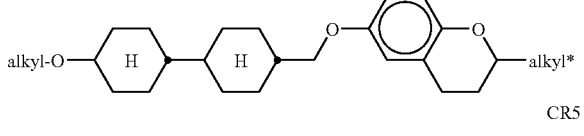
CR1

CR2

CR3

CR4

CR5 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote CH$_2$=CH—, CH$_3$CH=CH—, CH$_2$=CHCH$_2$CH$_2$—, CH$_3$CH=CHC$_2$H$_4$— or C$_3$H$_7$CH=CH—.

Very particular preference is given to mixtures comprising one, two or three compounds of the formula BC-2.

p) LC medium which additionally comprises one or more fluorinated phenanthrenes or dibenzofurans of the following formulae:

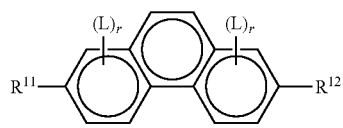
PH

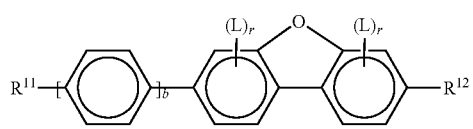
BF in which R$^{11}$ and R$^{12}$ each, independently of one another, have the meanings indicated above, b denotes 0 or 1, L denotes F, and r denotes 1, 2 or 3.

Particularly preferred compounds of the formulae PH and BF are selected from the following sub-formulae:

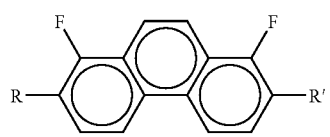
PH1

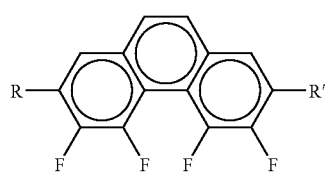
PH2

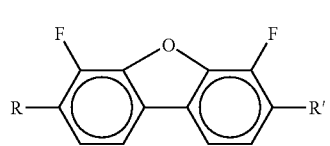
BF1

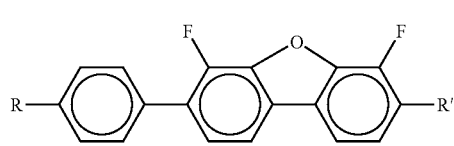
BF2 in which R and R' each, independently of one another, denote a straight-chain alkyl or alkoxy radical having 1-7 C atoms.

q) LC medium, preferably for use in PSA-OCB displays, which comprises one or more compounds of the following formulae:

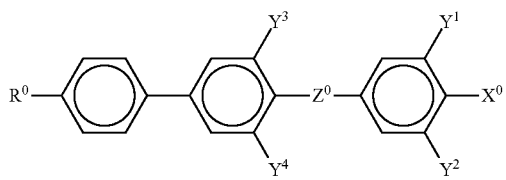
AA

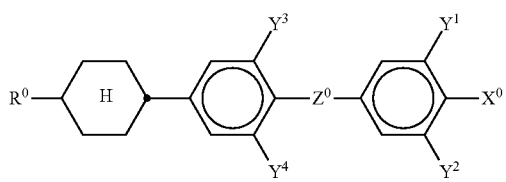
BB

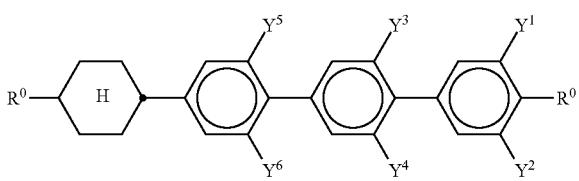
CC in which

R$^0$ on each occurrence, identically or differently, denotes n-alkyl, alkoxy, oxaalkyl, fluoroalkyl or alkenyl, each having up to 9 C atoms, X$^0$ denotes F, Cl or in each case halogenated alkyl, alkenyl, alkenyloxy or alkoxy, each having up to 6 C atoms, Z$^0$ denotes —CF$_2$O— or a single bond, Y$^{1-6}$ each, independently of one another, denote H or F.

X$^0$ is preferably F, Cl, CF$_3$, CHF$_2$, OCF$_3$, OCHF$_2$ OCF-HCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CF$_2$, particularly preferably F or OCF$_3$.

The compounds of the formula AA are preferably selected from the following formulae:

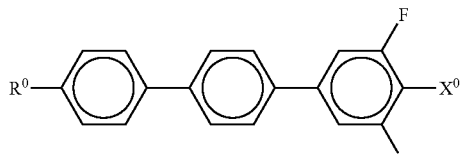
AA1

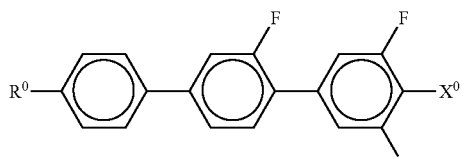
AA2

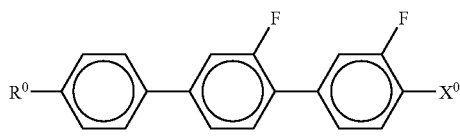
AA3

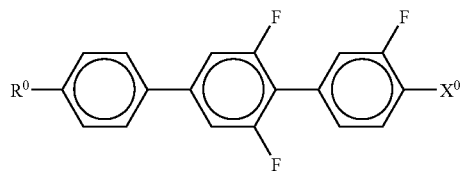
AA4

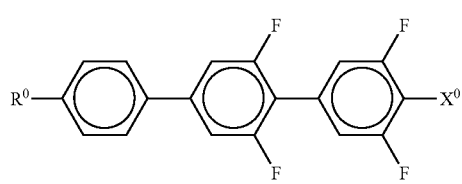
AA5

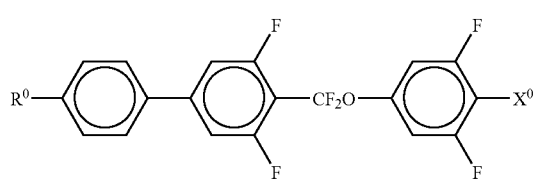
AA6

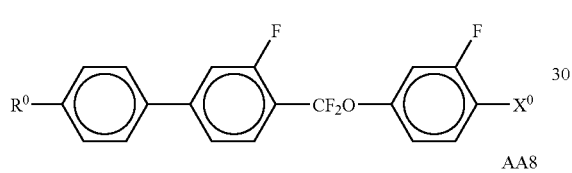
AA7

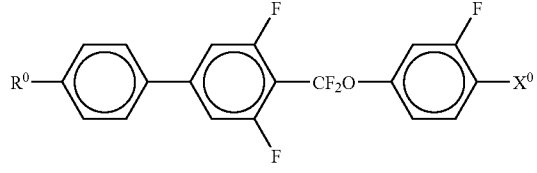
AA8

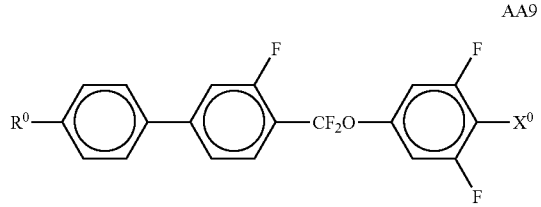
AA9 in which $R^0$ and $X^0$ have the meaning indicated above, and $X^0$ preferably denotes F. Particular preference is given to compounds of the formulae AA2 and AA6.

The compounds of the formula BB are preferably selected from the following formulae:

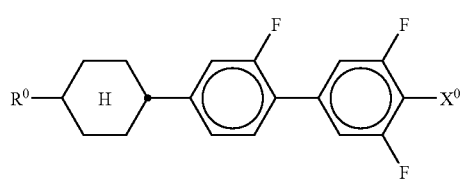
BB1

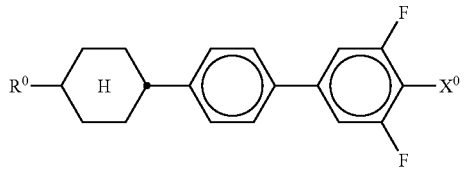
BB2

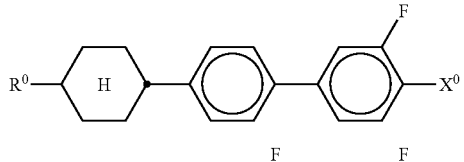
BB3

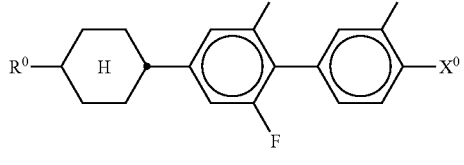
BB4

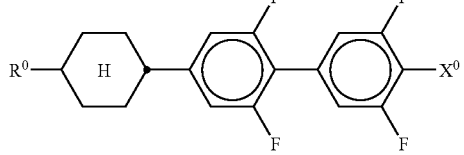
BB5

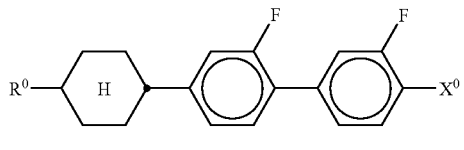
BB6 in which $R^0$ and $X^0$ have the meaning indicated above, and $X^0$ preferably denotes F. Particular preference is given to compounds of the formulae BB1, BB2 and BB5.

The compounds of the formula CC are preferably selected from the following formula:

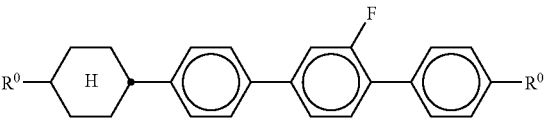
CC1 in which $R^0$ has on each occurrence, identically or differently, the meaning indicated above and preferably denotes alkyl having 1 to 6 C atoms.

r) LC medium which comprises 1 to 5, preferably 1, 2 or 3, polymerisable compounds.
s) LC medium in which the proportion of polymerisable compounds in the mixture as a whole is 0.05 to 5%, preferably 0.1 to 1%.
t) LC medium which comprises 1 to 8, preferably 1 to 5, compounds of the formula A and/or B, particularly preferably selected from the formulae A1, A2, A3, A6, B5, B6, B9 and B10. The proportion of these compounds in the mixture as a whole is preferably 5 to 70%, particularly preferably 10 to 40%. The content of these individual compounds is preferably in each case 2 to 60%, particularly preferably 2 to 40%.
u) LC medium which comprises 1 to 8, preferably 1 to 5, compounds selected from the formulae CY2, CY14 and PY2. The proportion of these compounds in the mixture as a whole is preferably 5 to 60%, particularly preferably 10 to 35%. The content of these individual compounds is preferably in each case 2 to 20%.
v) LC medium which comprises 1 to 8, preferably 1 to 5, compounds selected from the formulae CY8, PY8 and B10. The proportion of these compounds in the mixture as a whole is preferably 5 to 60%, particularly preferably 10 to 35%. The content of these individual compounds is preferably in each case 2 to 20%.
w) LC medium which comprises 1 to 8, preferably 1 to 5, compounds selected from the formulae CY9, PY7 and T2. The proportion of these compounds in the mixture as a whole is preferably 5 to 50%, particularly preferably 10 to 25%. The content of these individual compounds is preferably in each case 2 to 20%.
x) LC medium which comprises 1 to 10, preferably 1 to 8, compounds selected from the formulae ZK1, ZK2, ZK3, ZK4, T1 and O1. The proportion of these compounds in the mixture as a whole is preferably 3 to 45%, particularly preferably 5 to 35%. The content of these individual compounds is preferably in each case 2 to 15%.
y) LC medium in which the proportion of compounds of the formulae CY, PY and ZK in the mixture as a whole is greater than 50%, preferably greater than 60%.
z) LC medium which comprises one or more compounds selected from the formulae Fl, N1-N10, CR and PH. The proportion of these compounds in the mixture as a whole is preferably 2 to 30%. The content of these individual compounds is preferably in each case 1 to 15%.

The combination of compounds of the preferred embodiments a)-z) mentioned above with the polymerised compounds described above effects low threshold voltages, low rotational viscosities and very good low-temperature stabilities with maintenance of high clearing points and high HR values in the LC media according to the invention and allows a pretilt angle to be set in PSA displays. In particular, the LC media exhibit significantly shortened response times, in particular also the grey-shade response times, in PSA displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LC media according to the invention for use in displays of the VA type have a negative dielectric anisotropy $\Delta\epsilon$, preferably of about −0.5 to −7.5, in particular of about −2.5 to −5.5, at 20° C. and 1 kHz.

LC media according to the invention for use in displays of the OCB type have a positive dielectric anisotropy $\Delta\epsilon$, preferably of about +7 to +17 at 20° C. and 1 kHz.

The birefringence $\Delta n$ in LC media according to the invention for use in displays of the VA type is preferably less than 0.16, particularly preferably between 0.06 and 0.14, in particular between 0.07 and 0.12.

The birefringence $\Delta n$ in LC media according to the invention for use in displays of the OCB type is preferably between 0.14 and 0.22, in particular between 0.16 and 0.22.

The dielectrics may also comprise further additives known to the person skilled in the art and described in the literature. For example, 0 to 15% by weight of pleochroic dyes may be added, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), may be added in order to improve the conductivity, or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or the ways in which they are prepared can readily be derived from the prior art by the person skilled in the relevant art since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The construction of the LC displays according to the invention corresponds to the conventional geometry for PSA displays, as described in the prior art cited at the outset. Geometries without protrusions are preferred, in particular those in which, in addition, the electrode on the colour filter side is unstructured and only the electrode on the TFT side has slits. Particularly suitable and preferred electrode structures for PSA-VA displays are described, for example, in US 2006/0066793 A1.

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(m, m, z: each, independently of one another, 1, 2, 3, 4, 5 or 6)

TABLE A

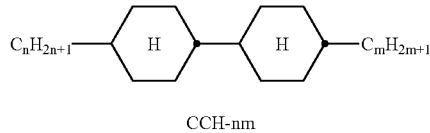

CCH-nm

TABLE A-continued
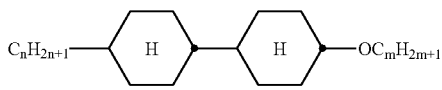
CCH-nOm
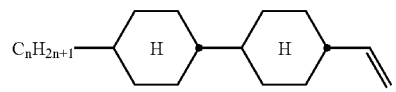
CC-n-V
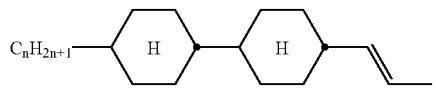
CC-n-V1
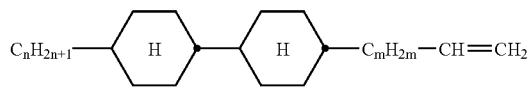
CC-n-mV
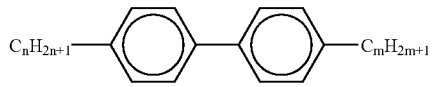
PP-n-m
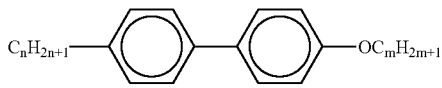
PP-n-Om
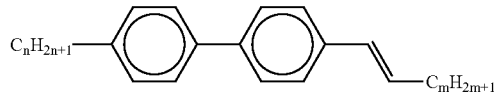
PP-n-Vm
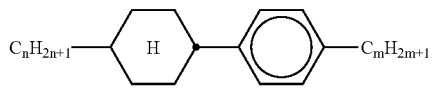
PCH-nm
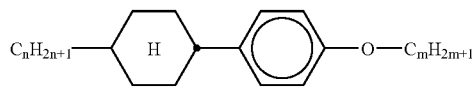
PCH-nOm
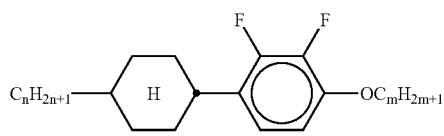
CY-n-Om TABLE A-continued
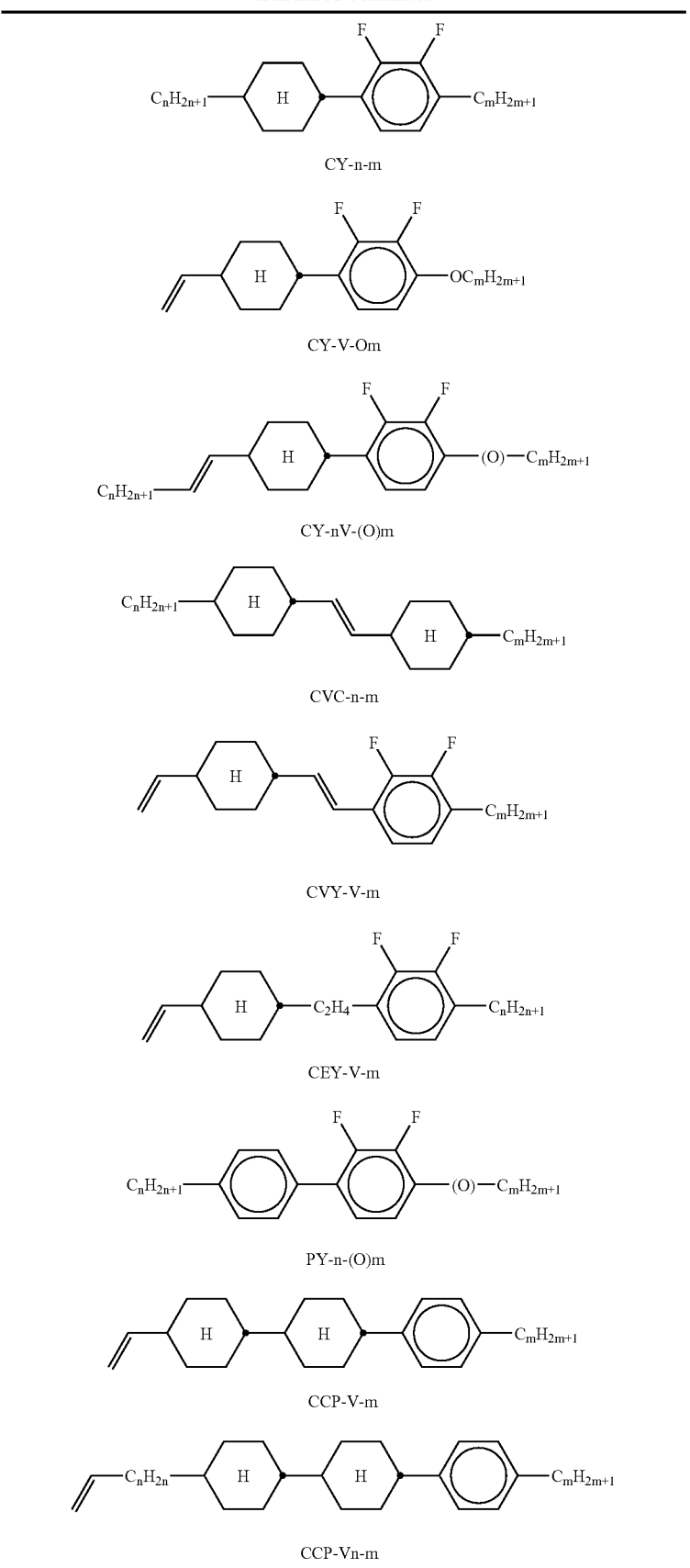

TABLE A-continued
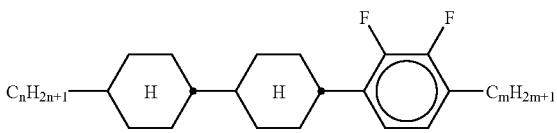
CCY-n-m
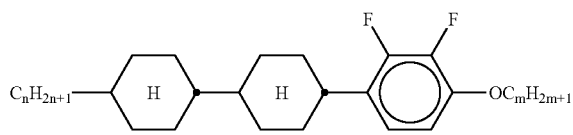
CCY-n-Om
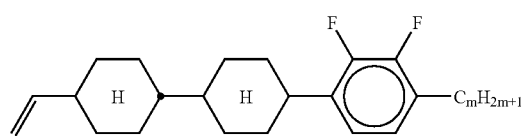
CCY-V-m
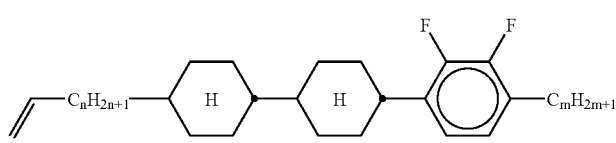
CCY-Vn-m
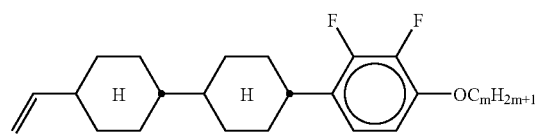
CCY-V-Om
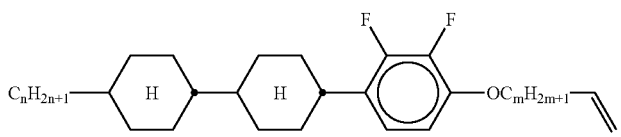
CCY-n-OmV
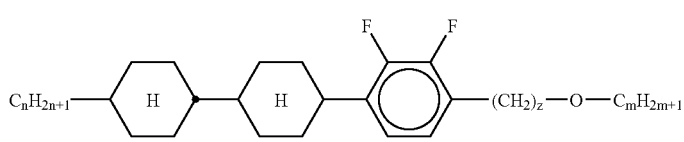
CCY-n-zOm
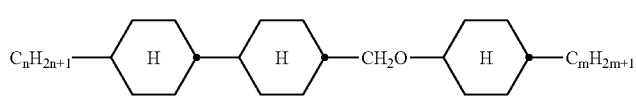
CCOC-n-m TABLE A-continued
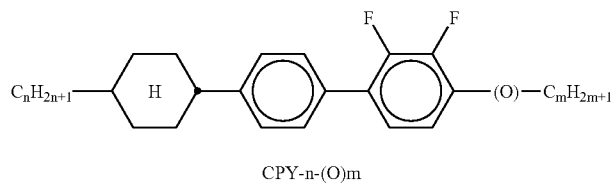
CPY-n-(O)m
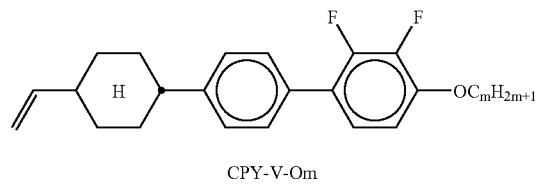
CPY-V-Om
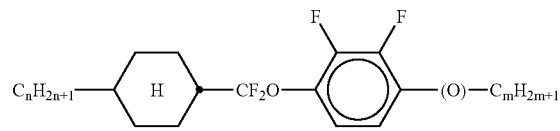
CQY-n-(O)m
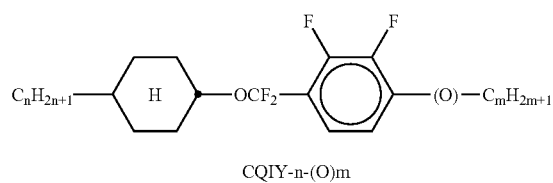
CQIY-n-(O)m
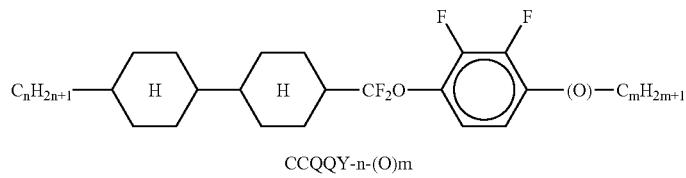
CCQQY-n-(O)m
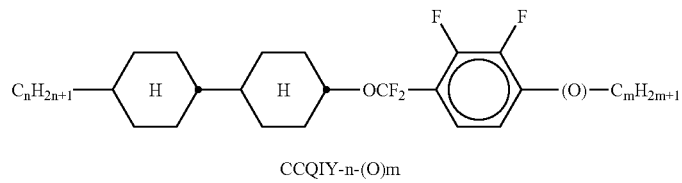
CCQIY-n-(O)m
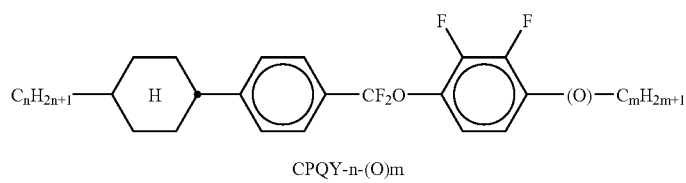
CPQY-n-(O)m
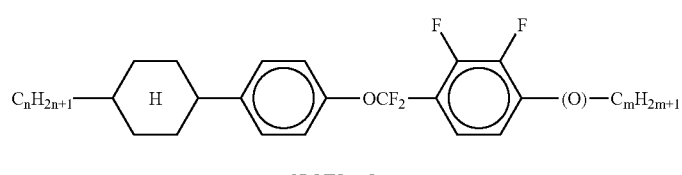
CPQIY-n-Om TABLE A-continued
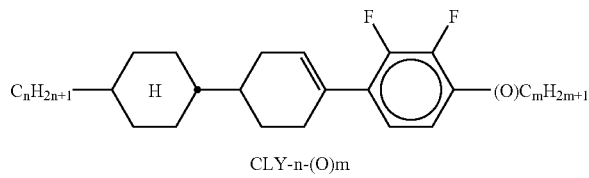
CLY-n-(O)m
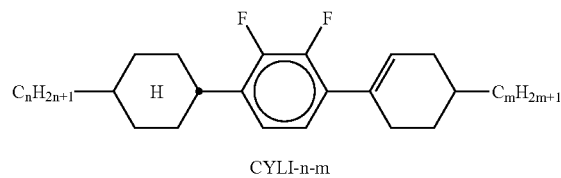
CYLI-n-m
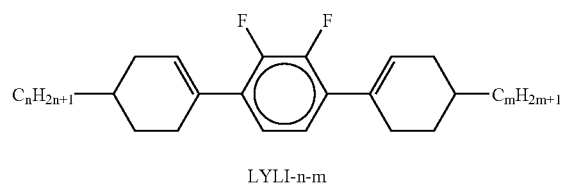
LYLI-n-m
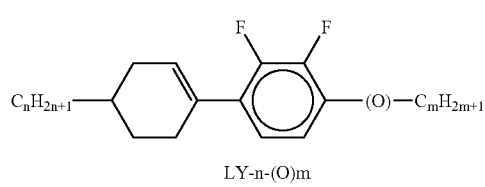
LY-n-(O)m
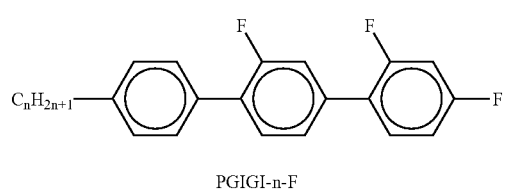
PGIGI-n-F
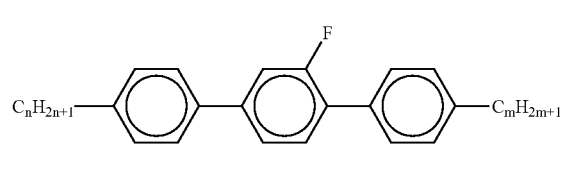
PGP-n-m
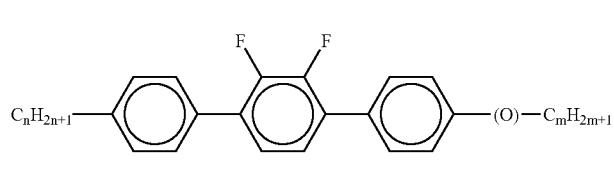
PYP-n-(O)m
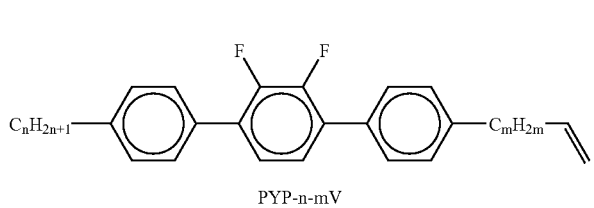
PYP-n-mV TABLE A-continued
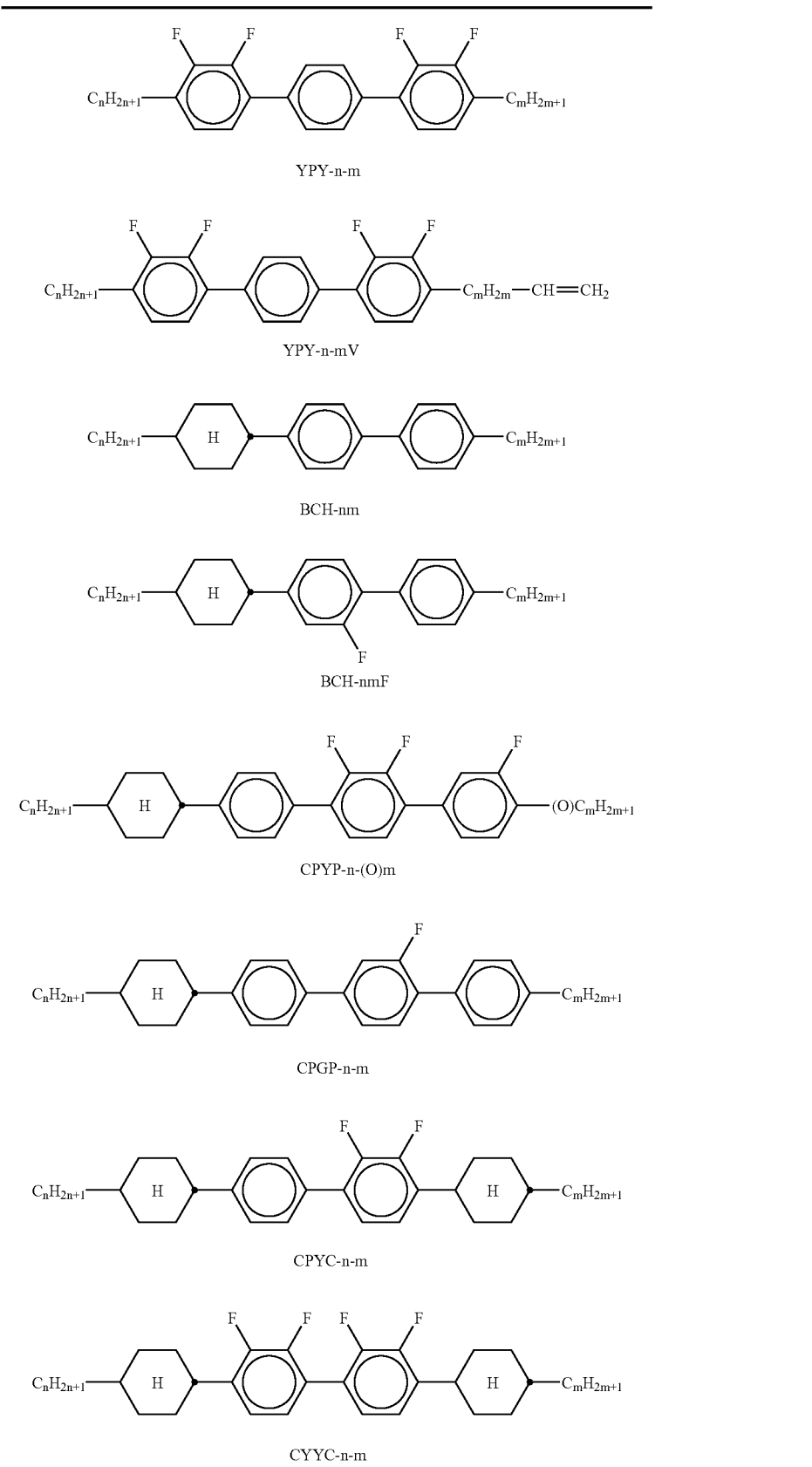

TABLE A-continued
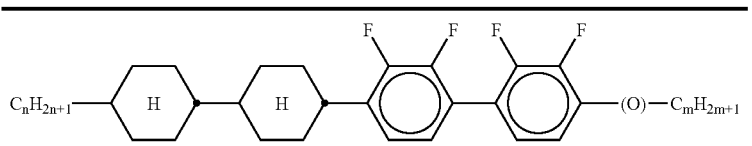
CCYY-n-m
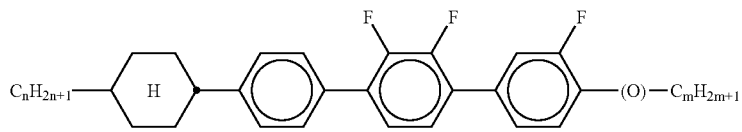
CPYG-n-(O)m
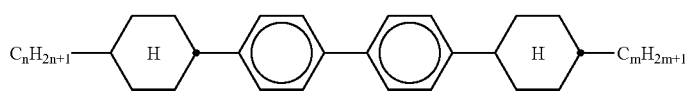
CBC-nm
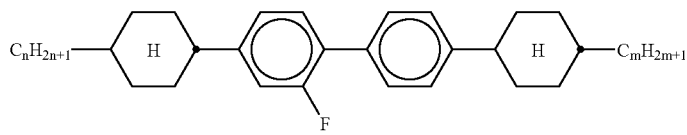
CBC-nmF
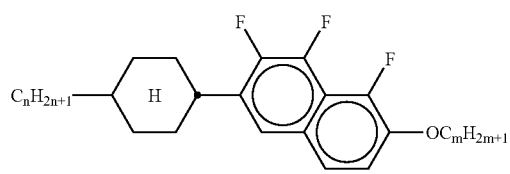
CNap-n-Om
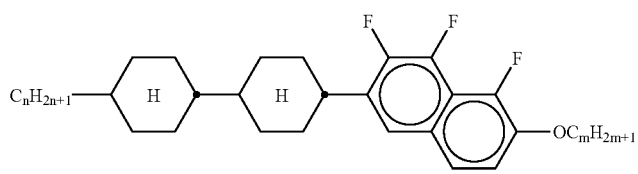
CCNap-n-Om
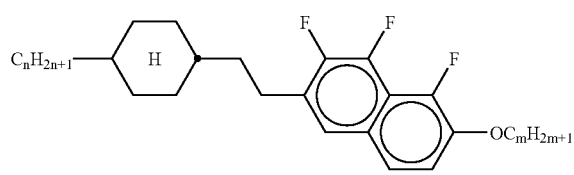
CENap-n-Om
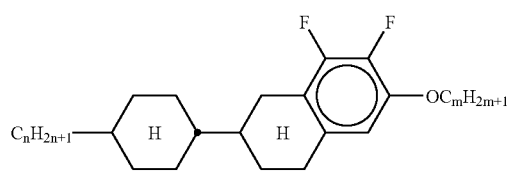
CTNap-n-Om TABLE A-continued
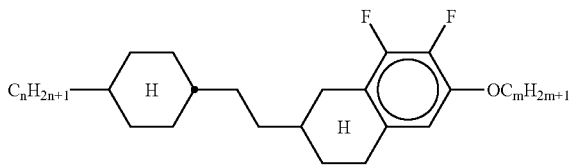
CETNap-n-Om
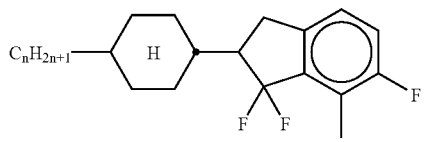
CK-n-F
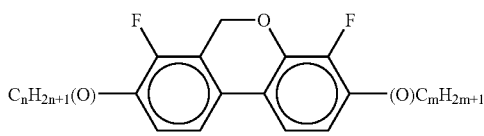
DFDBC-n(O)-(O)m
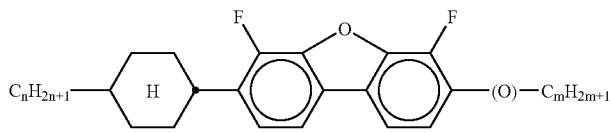
C-DFDBF-n-(O)m
In a preferred embodiment of the present invention, the LC media according to the invention comprise one or more compounds selected from the group consisting of compounds from Table A.
TABLE B
Table B indicates possible dopants which can be added to the LC media according to the invention.
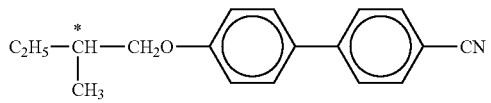
C 15
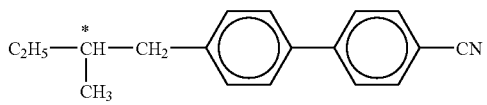
CB 15
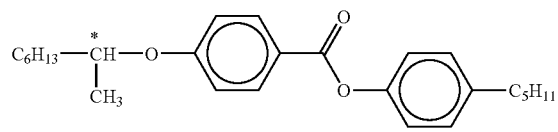
CM 21

TABLE B-continued
Table B indicates possible dopants which can be added to the LC media according to the invention.
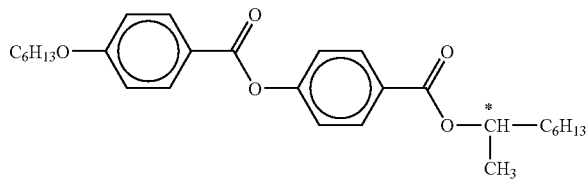
R/S-811
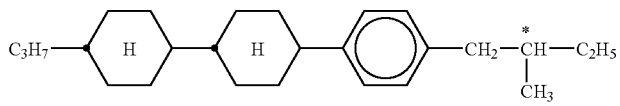
CM 44
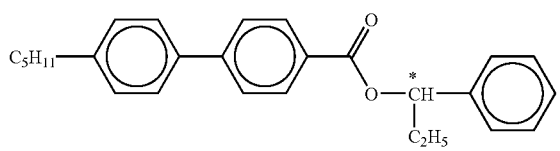
CM 45
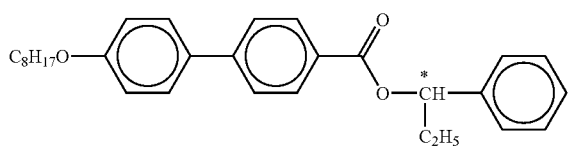
CM 44
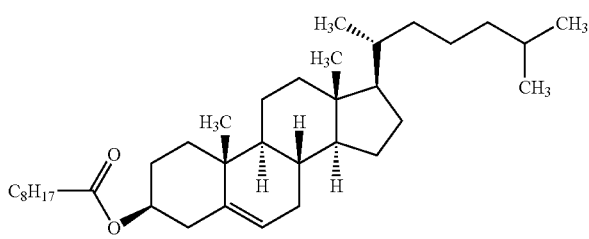
CN
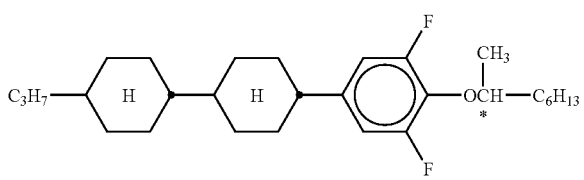
R/S-2011
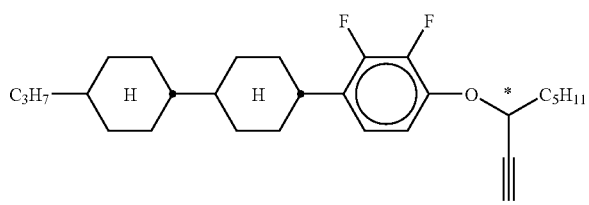
R/S-3011

TABLE B-continued

Table B indicates possible dopants which can be added to the LC media according to the invention.

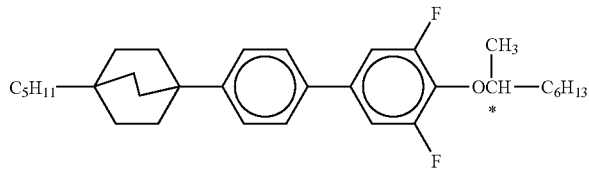

R/S-4011

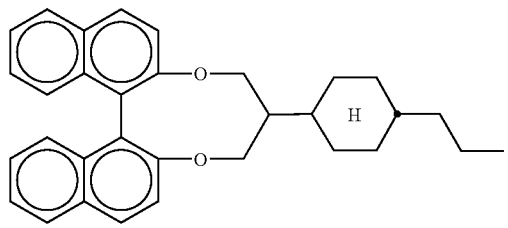

R/S-5011

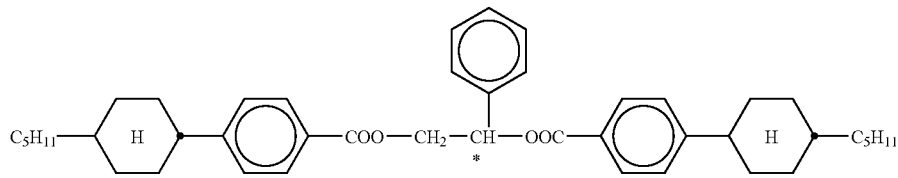

R/S-1011

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table B.

TABLE C

Table C indicates possible stabilisers which can be added to the LC media according to the invention.

(n here denotes an integer from 1 to 12)

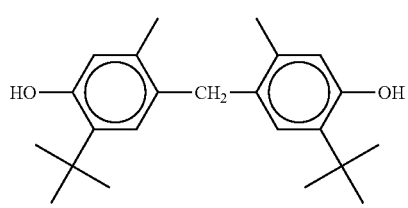

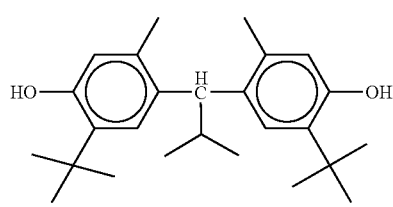

TABLE C-continued
Table C indicates possible stabilisers which can be added to the LC media according to the invention.
(n here denotes an integer from 1 to 12)
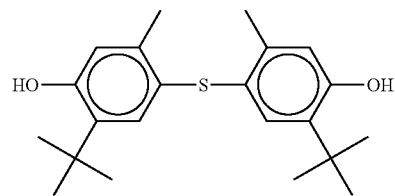
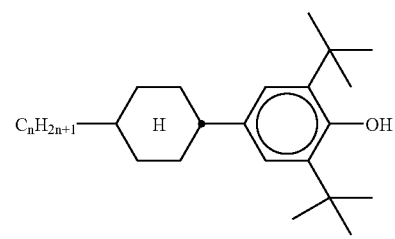
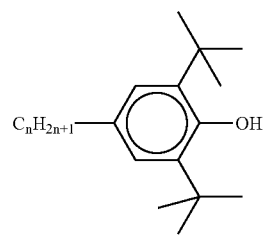
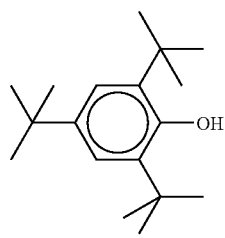
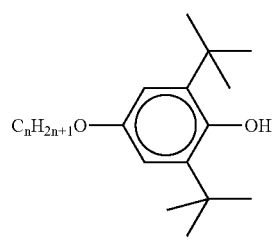
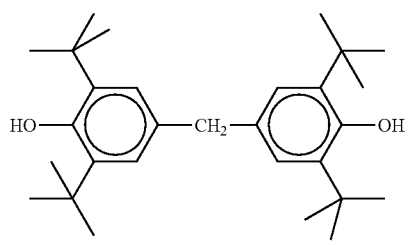

TABLE C-continued
Table C indicates possible stabilisers which can be added to the LC media according to the invention.
(n here denotes an integer from 1 to 12)
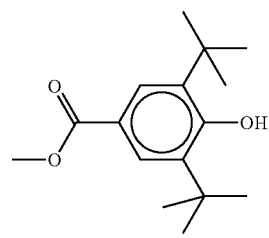
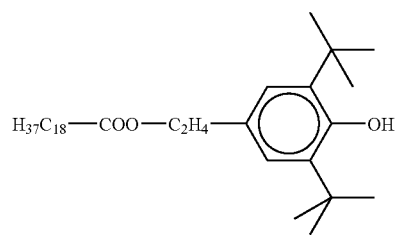
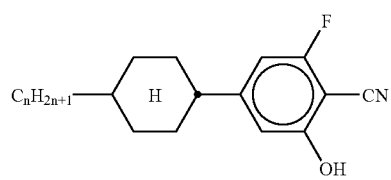
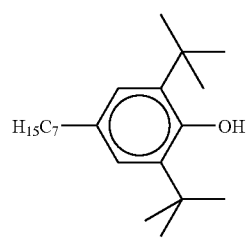
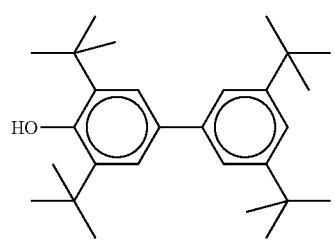

TABLE C-continued
Table C indicates possible stabilisers which can be added to the LC media according to the invention.
(n here denotes an integer from 1 to 12)
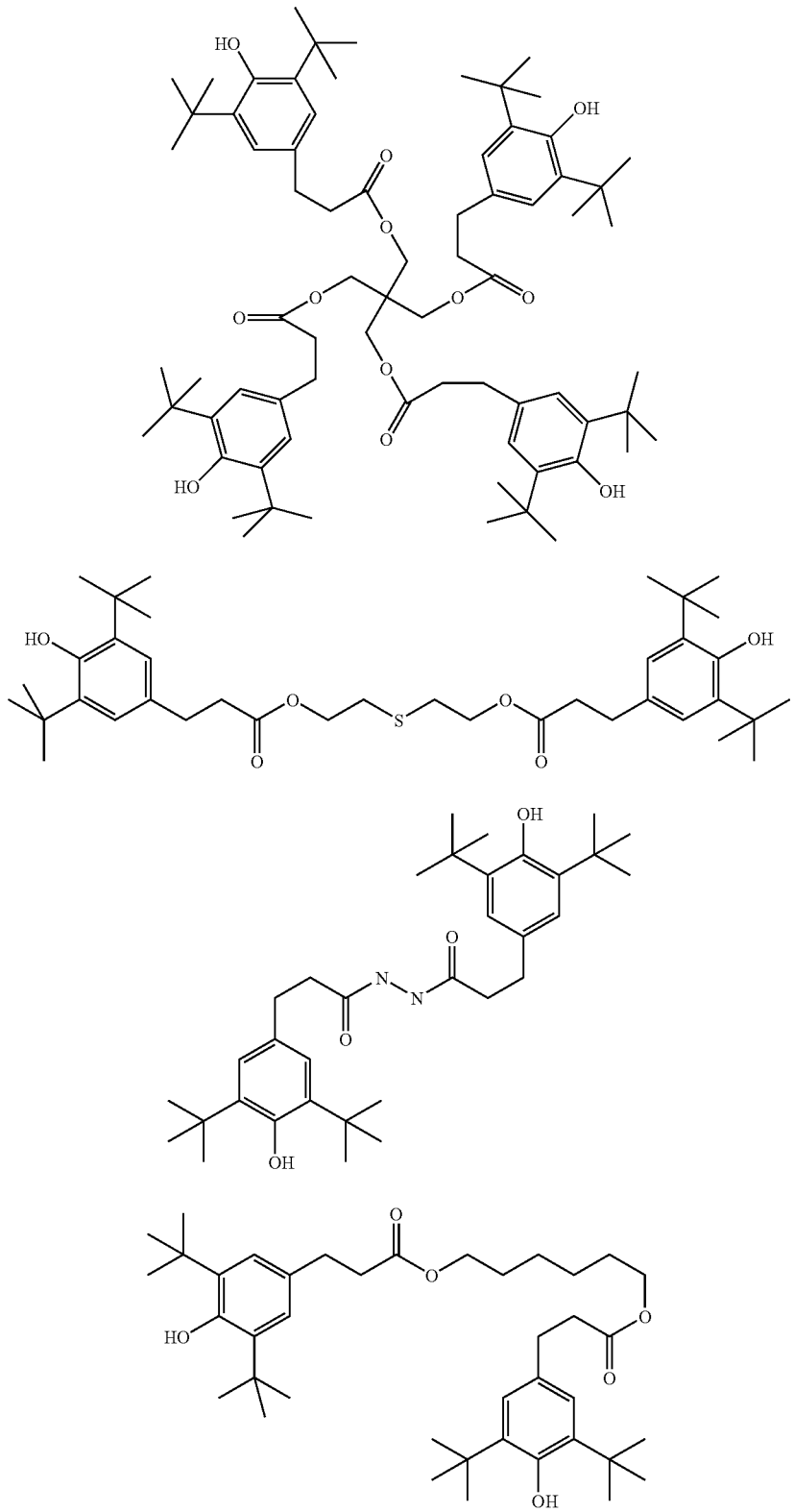

TABLE C-continued
Table C indicates possible stabilisers which can be added to the LC media according to the invention.
(n here denotes an integer from 1 to 12)
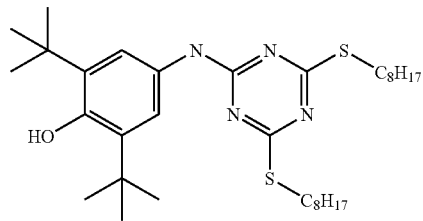
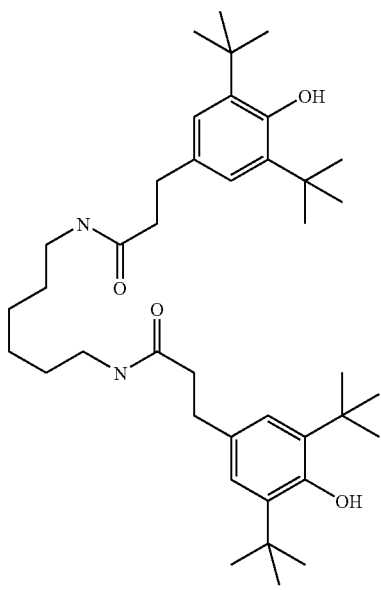
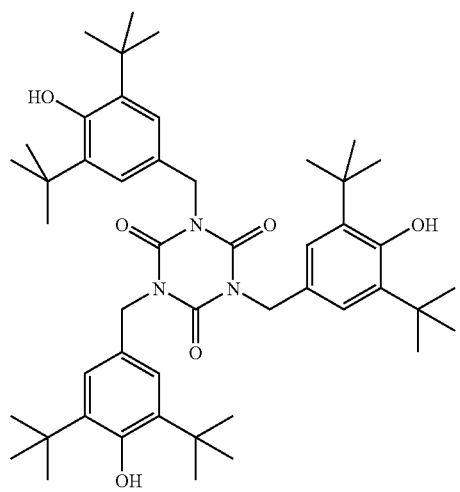

TABLE C-continued
Table C indicates possible stabilisers which can be added to the LC media according to the invention.
(n here denotes an integer from 1 to 12)
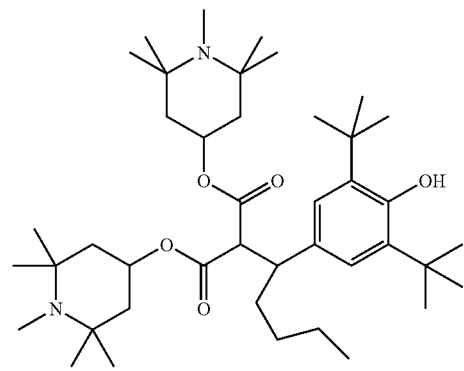
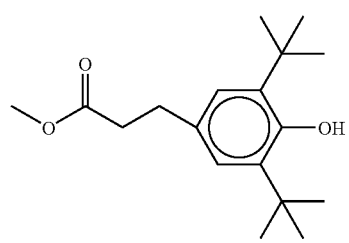
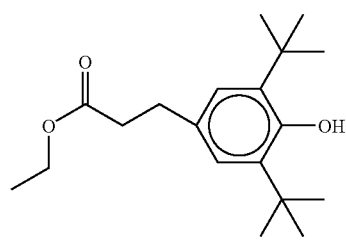
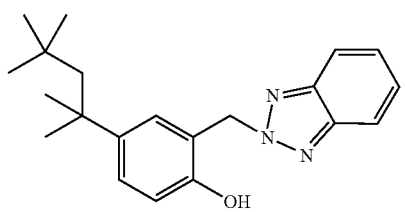
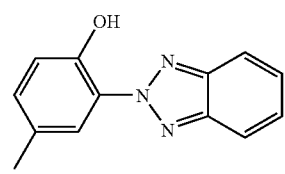
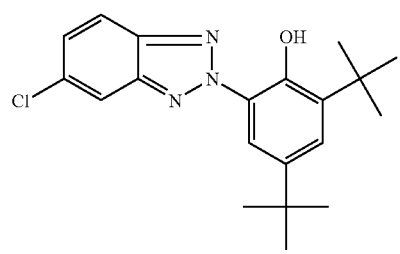

TABLE C-continued
Table C indicates possible stabilisers which can be added to the LC media according to the invention.
(n here denotes an integer from 1 to 12)
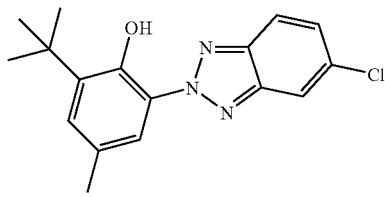
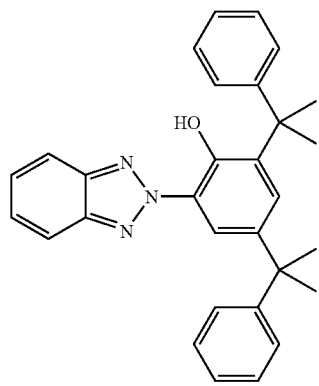
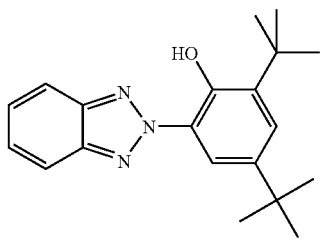
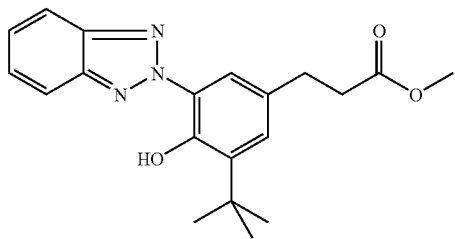
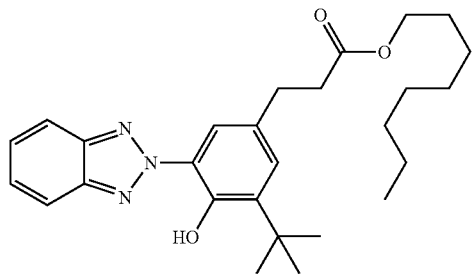

TABLE C-continued
Table C indicates possible stabilisers which can be added to the LC media according to the invention.
(n here denotes an integer from 1 to 12)
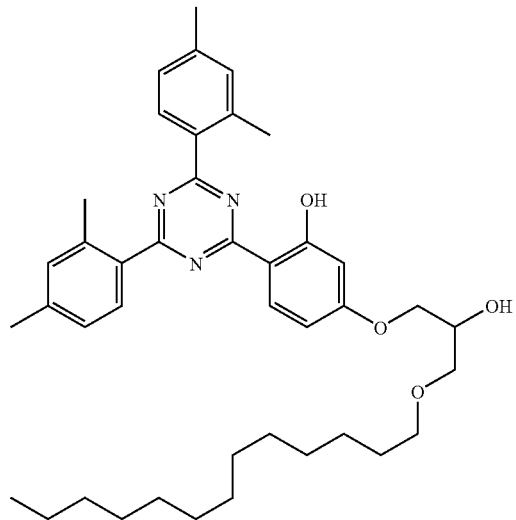
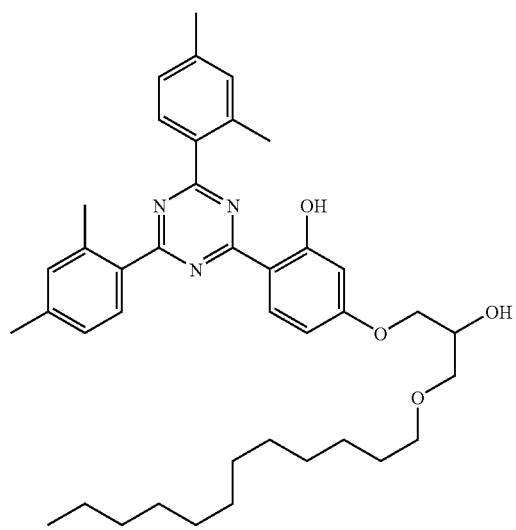
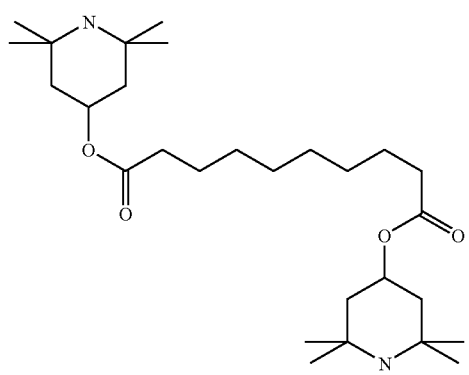

TABLE C-continued

Table C indicates possible stabilisers which can be added to the LC media according to the invention.
(n here denotes an integer from 1 to 12)

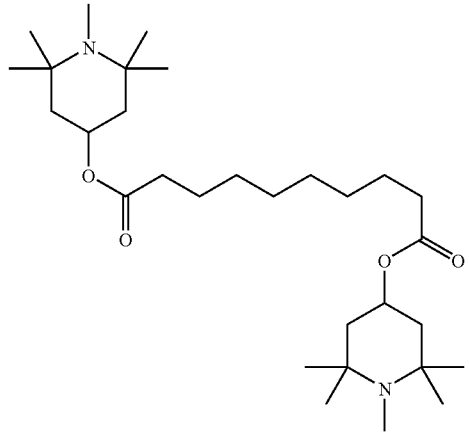

The LC media preferably comprise 0 to 10% by weight, in particular 0.01 to 5% by weight and particularly preferably 0.1 to 3% by weight, of stabilisers. The LC media preferably comprise one or more stabilisers selected from the group consisting of compounds from Table C.

In addition, the following abbreviations and symbols are used:

$V_o$ threshold voltage, capacitive [V] at 20° C.,
$n_e$ extraordinary refractive index at 20° C. and 589 nm,
$n_o$ ordinary refractive index at 20° C. and 589 nm,
Δn optical anisotropy at 20° C. and 589 nm,
$\in_\perp$ dielectric susceptibility perpendicular to the director at 20° C. and 1 kHz,
$\in_\parallel$ dielectric susceptibility parallel to the director at 20° C. and 1 kHz,
Δ∈ dielectric anisotropy at 20° C. and 1 kHz,
cl.p., T(N,I) clearing point [° C.],
$γ_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN],
LTS low-temperature stability (phase), determined in test cells,
$HR_{20}$ voltage holding ratio at 20° C. [%] and
$HR_{100}$ voltage holding ratio at 100° C. [%].

Unless explicitly noted otherwise, all concentrations in the present application are indicated in percent by weight and relate to the corresponding mixture or mixture component, unless explicitly indicated otherwise.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δg is determined at 1 kHz, unless explicitly indicated otherwise in each case.

For the present invention, the term "threshold voltage" relates to the capacitive threshold ($V_0$), also known as the Freedericksz threshold, unless explicitly indicated otherwise. In the examples, as is generally usual, the optical threshold for 10% relative contrast ($V_{10}$) May also be indicated.

The display used for measurement of the capacitive threshold voltage has two plane-parallel outer plates at a separation of 4 μm and electrode layers with overlying alignment layers of rubbed polyimide on the insides of the outer plates, which cause a homeotropic edge alignment of the liquid-crystal molecules.

The polymerisable compounds are polymerised in the display by UV irradiation for a pre-determined time, with a voltage simultaneously being applied to the display (usually 10 V to 30 V alternating current, 1 kHz). In the examples, unless indicated otherwise, a 28 mW/cm² mercury vapour lamp was used, the intensity was measured using a standard UV meter (model Ushio UNI meter) fitted with a 365 nm band-pass filter.

The tilt angle is determined by rotational crystal experiment (Autronic-Melchers TBA-105). A small value (i.e. a large deviation from a 90° angle) corresponds to a large tilt here.

Unless described otherwise in the following examples, the measurements of the tilt angle are carried out as follows: 0.3% of a polymerisable monomeric compound is added to the LC host mixture, and the resultant mixture is introduced into VA-e/o test cells (rubbed at 90°, VA polyimide alignment layer, layer thickness d≈4 μm). The cell is irradiated for 2 minutes with UV light having the intensity I=50 mW/cm² with application of a voltage U=24 V (alternating current), causing polymerisation of the monomeric compound. If desired, 0.006% of the photoinitiator Irgacure 651 is additionally added to the LC/monomer mixture in a second experiment, and the exposure time is shortened to 2 minutes. Before and after the UV irradiation, the tilt angle is determined by rotational crystal experiment (Autronic-Melchers TBA-105). A small value (i.e. a large deviation from a 90° angle) corresponds to a large tilt here.

The HR value is measured as follows: 0.3% of a polymerisable monomeric compound is added to the LC host mixture, and the resultant mixture is introduced into TN-VHR test cells (rubbed at 90°, TN polyimide alignment layer, layer thickness d≈4 μm). The HR value is determined after 5 min at 100° C. before and after UV exposure (sun test) for 2 h at 1 V, 60 Hz, 64 μs pulse (measuring instrument: Autronic-Meichers VHRM-105).

EXAMPLE 1

Nematic LC host mixture N1 is formulated as follows:

| | | | |
|---|---|---|---|
| CY-3-O4 | 23.50% | Cl.p. | +86.5 |
| CCY-3-O2 | 8.00% | Δn | 0.1199 |
| CCY-3-O3 | 8.00% | Δε | −4.1 |
| CCY-4-O2 | 1.50% | $\varepsilon_\parallel$ | 3.7 |
| CPY-2-O2 | 10.00% | $K_3/K_1$ | 1.03 |
| CPY-3-O2 | 10.00% | $\gamma_1$ | 176 |
| PYP-2-3 | 12.00% | $V_0$ | 2.05 |
| PYP-2-4 | 2.50% | | |
| CCP-V-1 | 1.50% | | |
| CC-3-V1 | 8.00% | | |
| CC-5-V | 15.00% | | |

Polymerisable mixtures MM1 and MM2 according to the invention are prepared by addition of 0.3% of methacrylate compounds M1 and M2 to LC host mixture N1. In addition, polymerisable comparative mixtures MA1 and MA2 are prepared by addition of 0.3% of the structurally analogous acrylate compounds A1 and A2 to N1.

$CH_2=C(CH_3)-COO-\phantom{xx}-OCO-C(CH_3)=CH_2$    M1

$CH_2=C(CH_3)-COO-\phantom{xx}-OCO-C(CH_3)=CH_2$    M2

$CH_2=CH-COO-\phantom{xx}-OCO-CH=CH_2$    A1

$CH_2=CH-COO-\phantom{xx}-OCO-CH=CH_2$    A2

For all mixtures, the HR is measured at 100° C. (after a conditioning time of minutes) as indicated above before and after UV exposure. For the polymerisable mixtures, the tilt angle after polymerisation is additionally determined as indicated above (with no photoinitiator). The results are shown in Table 1.

TABLE 1

| | | HR [%] | | |
|---|---|---|---|---|
| Mixture | Monomer | before UV | after 2 h UV | Tilt [°] |
| N1 | — | 81.6 | 59.7 | — |
| MM1 | M1 | 79.8 | 75.2 | 75.7 |

TABLE 1-continued

| | | HR [%] | | |
|---|---|---|---|---|
| Mixture | Monomer | before UV | after 2 h UV | Tilt [°] |
| MM2 | M2 | 79.3 | 69.6 | 78.9 |
| MA1 | A1 | 79.3 | 47.4 | 88.2 |
| MA2 | A2 | 80.6 | 34.0 | 87.0 |

As evident from Table 1, mixtures MM1 and MM2 according to the invention with methacrylates exhibit significantly higher VHR values after UV exposure than comparative mixtures MA1 and MA2 with acrylates. In addition, mixtures MM1 and MM2 according to the invention with methacrylates exhibit significantly more pronounced tilt angles (i.e. lower values) than comparative mixtures MA1 and MA2 with acrylates.

EXAMPLE 2

Nematic LC mixture N2 is formulated as follows:

| | | | |
|---|---|---|---|
| CCH-501 | 9.00% | Cl.p. | +70.0 |
| CCH-35 | 14.00% | Δn | 0.0825 |
| PCH-53 | 8.00% | Δε | −3.5 |
| CY-3-O4 | 14.00% | $\varepsilon_\parallel$ | 3.5 |
| CY-5-O4 | 13.00% | $K_3/K_1$ | 1.00 |
| CCY-3-O2 | 8.00% | $\gamma_1$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

LC host mixtures N3-N8 are prepared by addition of in each case 10% of the alkenyl compounds CC-3-V, CC-4-V, CC-5-V, CC-1-V3, CC-3-V1, and the homologous compound CCH-34 with no alkenyl group, to LC mixture N2.

Polymerisable mixtures MM3-MM8 according to the invention are prepared by addition of 0.3% of methacrylate compound M1 to host mixtures N3-N8.

The tilt angle of the mixtures after polymerisation is determined as indicated above (with no photoinitiator). The results are shown in Table 2.

TABLE 2

| Host | | Added compound | | |
|---|---|---|---|---|
| mixture | Mixture | Acronym | Concentration | Tilt [°] |
| N3 | MM3 | CC-3-V | 10% | 82.9 |
| N4 | MM4 | CC-4-V | 10% | 82.7 |
| N5 | MM5 | CC-5-V | 10% | 82.7 |
| N6 | MM6 | CC-1-V3 | 10% | 83.3 |
| N7 | MM7 | CC-3-V1 | 10% | 82.7 |
| N8 | MM8 | CCH-34 | 10% | 82.5 |

As evident from Table 2, all mixtures MM3-MM8 according to the invention exhibit a significantly more pronounced tilt angle (i.e. small values between 82° and 84°). The tilt angle here is approximately the same for all alkenyl compounds, and also only slightly smaller than in the mixture comprising the "non-alkenyl compound" CCH-34. Only a slight adverse effect on the tilt angle is thus observed in the mixtures according to the invention due to addition of various alkenyl compounds with simultaneous use of methacrylates as polymerisable component.

EXAMPLE 3

LC host mixture Ng is prepared by addition of 20% of the alkenyl compound CC-3-V to LC mixture N2 from Example 2.

Polymerisable mixtures MM9-MM12 according to the invention are prepared by addition of 0.3% of methacrylate compounds M1 and M2 to LC host mixture N2 or N9. In addition, polymerisable comparative mixtures MA3-MA6 are prepared by addition of 0.3% of the structurally analogous acrylate compounds A1 and A2 to N2 or N9.

For all mixtures, the HR is measured as indicated above before and after UV exposure. For the polymerisable mixtures, the tilt angle after polymerisation is additionally determined as indicated above (with no photoinitiator). The results are shown in Table 3,

TABLE 3

| Mixture | Host* | Monomer | HR [%] before UV | HR [%] after 2 h UV | Tilt [°] |
|---|---|---|---|---|---|
| N2 | — | — | 92.5 | 88.1 | — |
| N9 | N2 | — | 98.2 | 96.3 | — |
| MM9 | N2 | M1 | 93.6 | 93.2 | 85.2 |
| MM10 | N9 | M1 | 97.8 | 91.0 | 86.7 |
| MM11 | N2 | M2 | 93.1 | 94.2 | 81.4 |
| MM12 | N9 | M2 | 97.9 | 89.5 | 83.8 |
| MA3 | N2 | A1 | 93.8 | 80.2 | 88.2 |
| MA4 | N9 | A1 | 97.8 | 67.8 | 89.5 |
| MA5 | N2 | A2 | 93.1 | 91.1 | 84.2 |
| MA6 | N9 | A2 | 97.0 | 55.0 | 89.9 |

*N9 = N2 + 20% of CC-3-V

As evident from Table 3, mixtures MM9-MM12 according to the invention with methacrylates generally exhibit significantly higher HR values after UV exposure and significantly higher tilt angles (i.e. lower ° values) than the analogous comparative mixtures MA3-MA6 with acrylates.

In addition, Table 3 shows that the pure LC host mixture N9 (with alkenyl compound CC-3-V) has a higher HR value compared with the pure LC host mixture N2 (with no alkenyl compound). This HR value is in some cases significantly reduced by addition of a polymerisable compound to the alkenyl-containing LC host mixture N9 (with alkenyl compound). By contrast, the HR value in the case of N2 is in some cases even increased by addition of the polymerisable compound. However, the reduction in the HR value of N9 is significantly less pronounced on use of the methacrylates M1 and M2 than in the case of the acrylates A1 and A2.

The use of methacrylates thus helps to limit the drop in the HR in the case of alkenyl-containing LC host mixtures in the PSA display.

EXAMPLE 4

LC host mixture N10 is prepared by addition of 10% of compound CLY-3-O3 (with a cyclohexenyl group) to LC mixture N2 from Example 2.

Polymerisable mixtures MM13 and MM14 according to the invention are prepared by addition of 0.3% of the methacrylate compound N2 to LC host mixture N2 or N10. In addition, polymerisable comparative mixtures MA7 and MA8 are prepared by addition of 0.3% of the acrylate compound A1 to N2 or N10.

For the polymerisable mixtures, the tilt angle after polymerisation is determined as indicated above (with no photoinitiator). The results are shown in Table 4.

TABLE 4

| Mixture | Host* | Monomer | Tilt [°] |
|---|---|---|---|
| MM13 | N2 | M2 | 81.4 |
| MM14 | N10 | M3 | 80.7 |
| MA7 | N2 | A1 | 88.2 |
| MA8 | N10 | A1 | 89.5 |

*N10 = N2 + 10% of CLY-3-O3

Mixtures MM13 and MM14 according to the invention with methacrylates exhibit significantly more pronounced tilt angles (i.e. lower ° values) than comparative mixtures MA7 and MA8 with acrylates.

The invention claimed is:

1. A polymer sustained alignment-vertical alignment or polymer sustained alignment-optically compensated bend liquid-crystal display comprising:
   a liquid-crystal cell comprising two substrates, where at least one substrate is transparent to light and at least one substrate has an electrode layer, and a layer, located between the substrates, of a liquid-crystal medium comprising a polymerized component and a low-molecular-weight component, where the polymerized component is obtainable by polymerization of one or more polymerizable compounds between the substrates of the liquid-crystal cell in the liquid-crystal medium with application of an electrical voltage,
   wherein all polymerizable compounds present in the liquid-crystal medium contain exclusively methacrylate group(s) as polymerizable group(s), and the low-molecular-weight component comprises one or more mesogenic or liquid-crystalline compounds containing one or more alkenyl groups which are stable with respect to polymerization of methacrylate groups.

2. A liquid-crystal display according to claim 1, wherein said polymerizable component comprises one or more polymerizable compounds containing a methacrylate group and one or more polymerizable compounds containing two or more methacrylate groups.

3. A liquid-crystal display according to claim 1, wherein said polymerizable component comprises exclusively polymerizable compounds containing two methacrylate groups.

4. A liquid-crystal display according to claim 1, wherein said polymerizable compounds are selected from formula I:

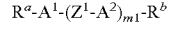

$R^a\text{-}A^1\text{-}(Z^1\text{-}A^2)_{m1}\text{-}R^b$      I in which the individual radicals have the following meaning:
$A^1$ and $A^2$ are each, independently of one another, an aromatic, heteroaromatic, alicyclic or heterocyclic group, which may also contain fused rings, and which is optionally mono- or polysubstituted by L,
$Z^1$ is on each occurrence, identically or differently, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —C≡C—, —CH═CH—COO—, —OCO—CH═CH—, CR$^0$R$^{00}$ or a single bond,
L, R$^a$ and R$^b$ are each, independently of one another, H, halogen, SF$_5$, NO$_2$, a carbon group or hydrocarbon group, where the compounds contain at least one radical L, R$^a$ and R$^b$ which denotes or contains a group P-Sp-,
R$^0$ and R$^{00}$ each, independently of one another, H or alkyl having 1 to 12 C atoms,
P CH$_2$═C(CH$_3$)—COO—, Sp a spacer group or a single bond,
m1 0, 1, 2, 3 or 4, and
n1 1, 2, 3 or 4.

5. A liquid-crystal display according to claim 4, wherein
$A^1$ and $A^2$ each, independently of one another, denote 1,4-phenylene, naphthalene-1,4-diyl or naphthalene-2,6-diyl, in which, in addition, one or more CH groups in these groups are each optionally replaced by N, cyclohexane-1,4-diyl, in which, in addition, one or more non-adjacent $CH_2$ groups are each optionally replaced by O and/or S, 1,4-cyclohexenylene, bicyclo [1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups are unsubstituted or mono- or polysubstituted by L, L denotes P-Sp-, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy, or alkoxycarbonyloxy having 1 to 25 C atoms and, in which one or more H atoms are each optionally replaced by F, Cl or P-Sp-, $Y^1$ denotes halogen, $R^x$ denotes P-Sp-, H, halogen, straight-chain, branched or cyclic alkyl having 1 to 25 C atoms, in which, in addition, one or more non-adjacent $CH_2$ groups are each optionally replaced by —O—, —S—, —CO—, —CO—O—, —O—CO—, —O—CO—O— in such a way that O and/or S atoms are not linked directly to one another, and in which, in addition, one or more H atoms are each optionally replaced by F, Cl or P-Sp-, an optionally substituted aryl or aryloxy group having 6 to 40 C atoms, or an optionally substituted heteroaryl or heteroaryloxy group having 2 to 40 C atoms, and $R^a$ and $R^b$ each, independently of one another, denote P-Sp-, H, L as defined above, or straight-chain or branched alkyl having 1 to 25 C atoms, in which, in addition, one or more non-adjacent $CH_2$ groups are each optionally replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, and in which, in addition, one or more H atoms are each optionally replaced by F, Cl, Br, I, CN or P-Sp-, where at least one of the radicals $R^a$, $R^b$ and L contains at least one group P-Sp-.

6. A liquid-crystal display according to claim 4, wherein said polymerizable compounds are selected from the following sub-formulae:

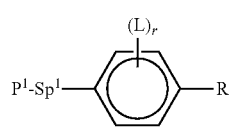
I1

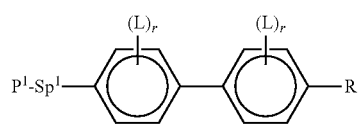
I2

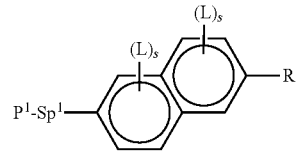
I3

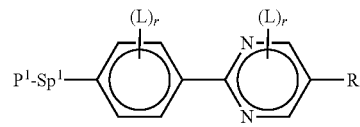
I4

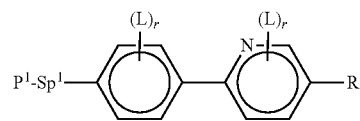
I5

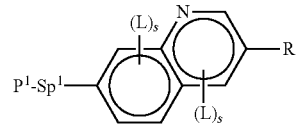
I6

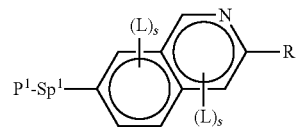
I7

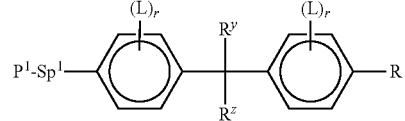
I8

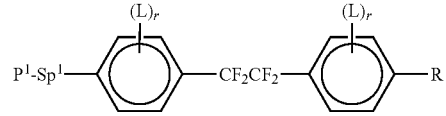
I9 in which

R is P-Sp-, H, halogen, straight-chain, branched or cyclic alkyl having 1 to 25 C atoms, in which, in addition, one or more non-adjacent $CH_2$ groups are each optionally replaced by —O—, —S—, —CO—, —CO—O—, —O—CO—, —O—CO—O— in such a way that O and/or S atoms are not linked directly to one another, and in which, in addition, one or more H atoms are each optionally replaced by F, Cl or P-Sp-, an optionally substituted aryl or aryloxy group having 6 to 40 C atoms, or an optionally substituted heteroaryl or heteroaryloxy group having 2 to 40 C atoms, r denotes 0, 1, 2, 3 or 4, s denotes 0, 1, 2 or 3, and $R^y$ and $R^z$ each, independently of one another, denote H or $CH_3$.

7. A liquid-crystal according to claim 1, wherein said low-molecular-weight component comprises one or more compounds selected from the following formulae:

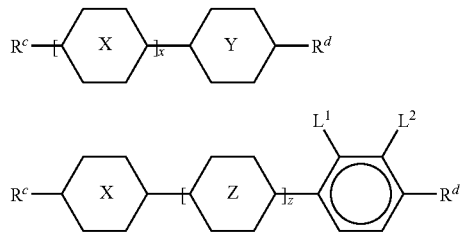

A

B in which the individual radicals, on each occurrence identically or differently, each, independently of one another, have the following meaning:

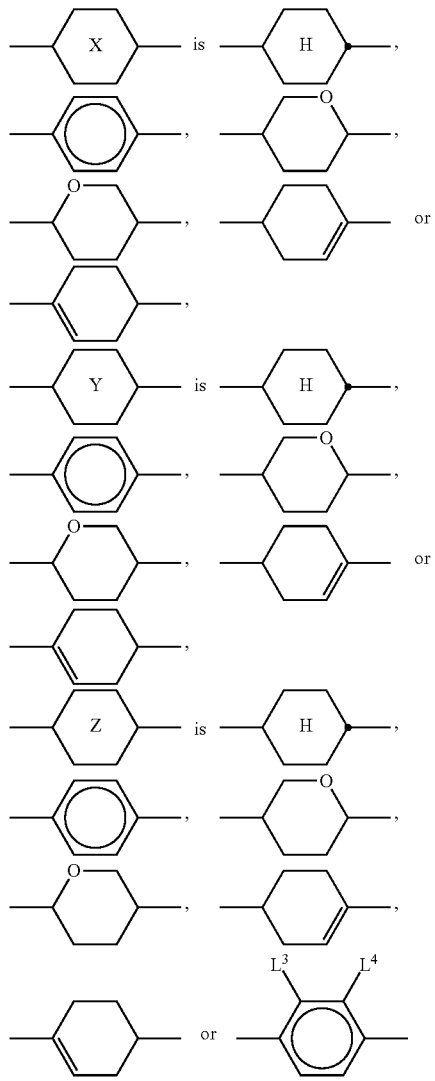

R$^c$ alkenyl having 2 to 9 C atoms or, if at least one of the rings X, Y and Z denotes cyclohexenyl, R$^c$ can also be alkyl having 1 to 12 C atoms, in which, in addition, one or two non-adjacent CH$_2$ groups are each optionally replaced by —O—, —CH═CH—, —CO—, —OCO— or —COO— in such a way that O atoms are not linked directly to one another, R$^d$ alkyl having 1 to 12 C atoms, in which, in addition, one or two non-adjacent CH$_2$ groups are each optionally replaced by —O—, —CH═CH—, —CO—, —OCO— or —COO— in such a way that O atoms are not linked directly to one another, L$^{1-4}$ each, independently of one another, H, F, Cl, OCF$_3$, CF$_3$, CH$_3$, CH$_2$F or CHF$_2$H, x is 1 or 2, and z is 0 or 1.

8. A liquid-crystal display according to claim 7, wherein said low-molecular-weight component comprises one or more compounds selected from the following formulae:

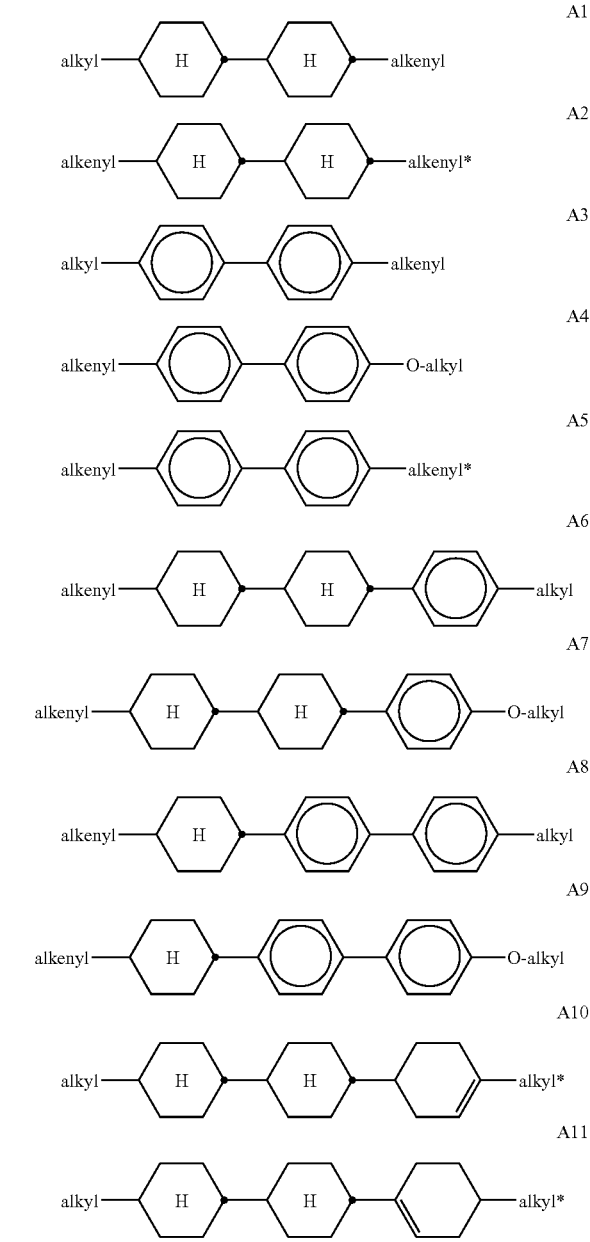

A12
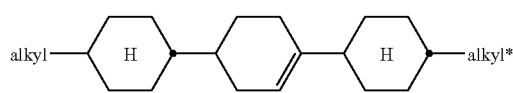

B1
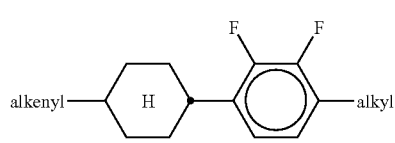

B2
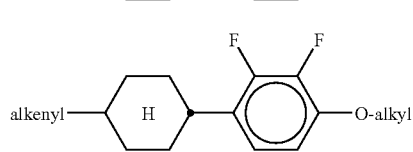

B3
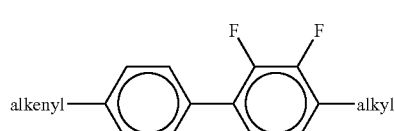

B4
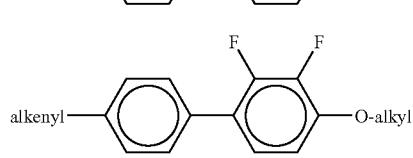

B5
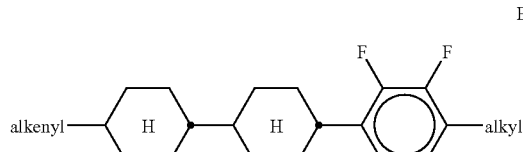

B6
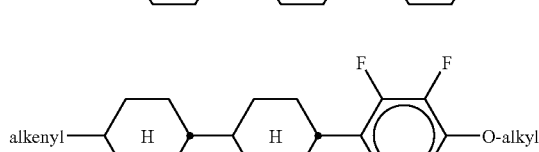

B7
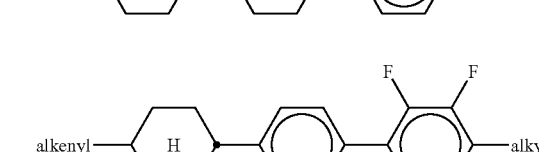

B8
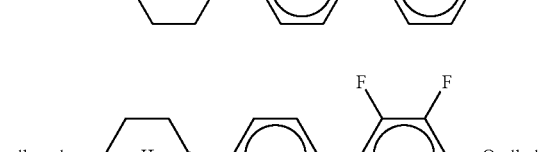

B9
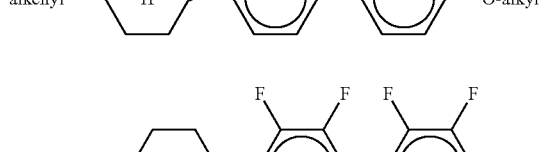

B10
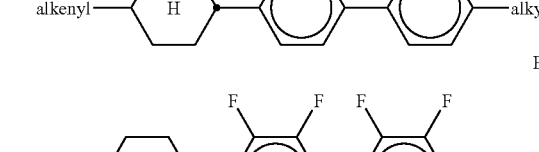

B11
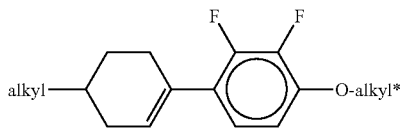

B12
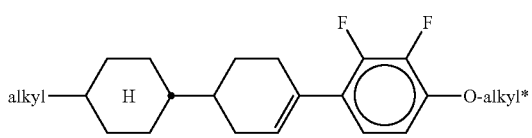

in which alkyl denotes a straight-chain alkyl radical having 1-6 C atoms, and alkenyl and alkenyl* each, independently of one another, denote a straight-chain alkenyl radical having 2-7 C atoms.

9. A liquid-crystal display according to claim 7, wherein said low-molecular-weight component comprises one or more compounds selected from the following formulae:

A1a
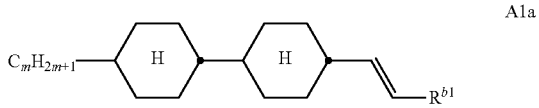

A3a
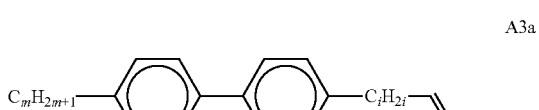

A6a
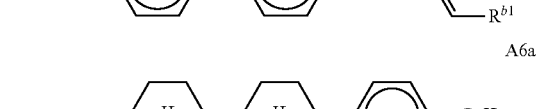

B5a
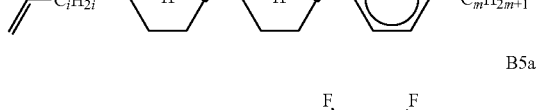

B6a
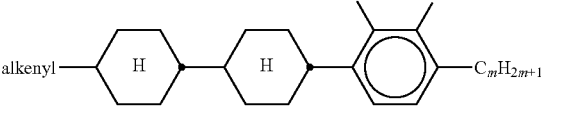

B9a
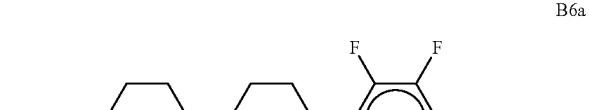

B10a
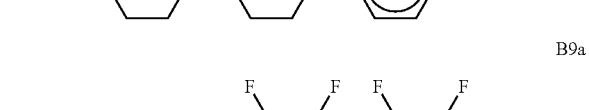

-continued

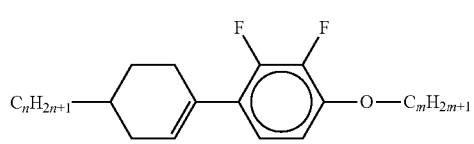
B11a

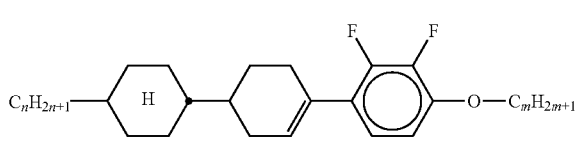
B12a in which m and n each, independently of one another, denote 1, 2, 3, 4, 5 or 6, i is 0, 1, 2 or 3, $R^{b1}$ denotes H, $CH_3$ or $C_2H_5$, and alkenyl denotes $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

10. A liquid-crystal display according to claim 1, wherein said liquid-crystal medium additionally comprises one or more compounds selected from the following formulae:

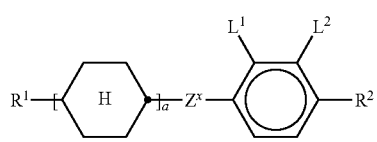
CY

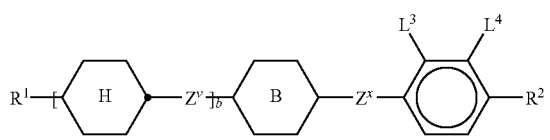
PY in which the individual radicals have the following meaning:
a 1 or 2,
b 0 or 1,

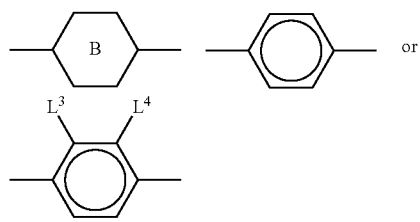

$R^1$ and $R^2$ each, independently of one another, alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another,
$Z^x$ and $Z^y$ each, independently of one another —CH=CH—, —CH$_2$O—, —OCH$_2$—, —CF$_2$O—, —OCF$_2$—, —O—, —CH$_2$—, —CH$_2$CH$_2$— or a single bond,
$L^{1-4}$ each, independently of one another, F, Cl, OCF$_3$, CF$_3$, CH$_3$, CH$_2$F, CHF$_2$.

11. A liquid-crystal display according to claim 1, wherein said liquid-crystal medium additionally comprises one or more compounds of the following formula:

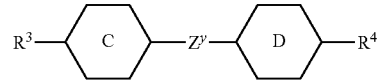
ZK in which the individual radicals have the following meaning:

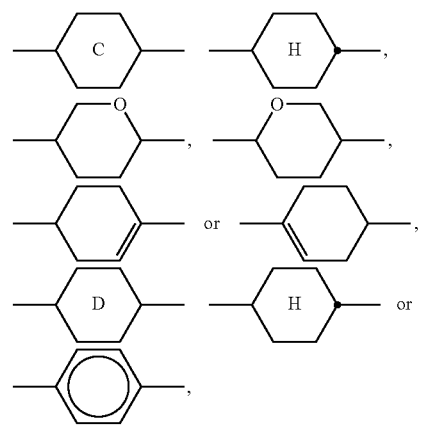

$R^3$ and $R^4$ each, independently of one another, alkyl having 1 to 12 C atoms, in which, in addition, one or two non-adjacent $CH_2$ groups are each optionally replaced by —O—, —CH=CH—, —CO—, —OCO— or —COO— in such a way that O atoms are not linked directly to one another,
$Z^y$ —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

12. A liquid-crystal display according to claim 1, wherein said display is a PSA-VA or PSA-OCB display.

13. A liquid-crystal display according to claim 4, wherein $A^1$ and $A^2$ are each, independently of one another, an aromatic, heteroaromatic, alicyclic or heterocyclic group, having 4 to 25 C atoms, which may also contain fused rings, and which is optionally mono- or polysubstituted by L.

14. A liquid-crystal display according to claim 7, wherein said polymerizable compounds are selected from formula I:

$$R^a\text{-}A^1\text{-}(Z^1\text{-}A^2)_{m1}\text{-}R^b \qquad \text{I}$$

wherein:
$A^1$ and $A^2$ are each, independently of one another, 1,4-phenylene, naphthalene-1,4-diyl or naphthalene-2,6-diyl, in which one or more CH groups in these groups are each optionally replaced by N, or cyclohexane-1,4-diyl, in which, in addition, one or more non-adjacent $CH_2$ groups are each optionally replaced by O and/or S, 1,4-cyclohexenylene, bicyclo[1.1.1]pentane-1,3-diyl, bicyclo-[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl,
which in each case is unsubstituted or mono- or polysubstituted by L;
$Z^1$ is on each occurrence, identically or differently, —O—, —S—, —CO—, —CO—O—, —OCO—, —O—CO—

—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO— CH=CH—, CR$^O$R$^{OO}$ or a single bond;

L is P-Sp-, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, unsubstituted silyl, silyl substituted by halogen, —CN, R$^O$, —OR$^O$, —CO—R$^O$, —CO—O—R$^O$, —O—CO—R$^O$ or —O—CO—O—R$^O$, unsubstituted aryl having 6 to 20 C atoms, aryl having 6 to 20 C atoms which is substituted by halogen, —CN, R$^O$, —OR$^O$, —CO—R$^O$, —CO—O—R$^O$, —O—CO—R$^O$ or —O—CO—O—R$^O$, or straight-chain or branched alkyl, alkoxy, alkylcarbonyl, alkoxycarbonyl, alkylcarbonyloxy, or alkoxycarbonyloxy having 1 to 25 C atoms and, in which one or more H atoms are each optionally replaced by F, Cl or P-Sp-;

R$^a$ and R$^b$ are each, independently of one another, P-Sp-, H, L or straight-chain or branched alkyl having 1 to 25 C atoms, in which, in addition, one or more non-adjacent CH$_2$ groups are each optionally replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms are each optionally replaced by F, Cl, Br, I, CN or P-Sp-;

R$^O$ and R$^{OO}$ are each, independently of one another, H or alkyl having 1 to 12 C atoms;

Y$^1$ is halogen;

R$^x$ is P-Sp-, H, halogen, or straight-chain, branched or cyclic alkyl having 1 to 25 C atoms wherein one or more non-adjacent CH$_2$ groups are each optionally replaced by —O—, —S—, —CO—, —CO—O—, —O—CO—, —O—CO—O— in such a way that O and/or S atoms are not linked directly to one another, and wherein one or more H atoms are each optionally replaced by F, Cl or P-Sp-;

P CH$_2$=C(CH$_3$)—COO—;

Sp a spacer group or a single bond;

m1 0, 1, 2, 3 or 4; and n1 1, 2, 3 or 4;

where at least one of the radicals R$^a$, R$^b$ and L contains at least one group P-Sp-.

15. A liquid-crystal display according to claim 14, wherein one or both of R$^a$ and R$^b$ is P-Sp-.

16. A liquid-crystal display according to claim 7, wherein said polymerizable compounds are selected from formula II:

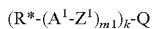    II wherein:

A$^1$ is in each case, independently of one another, 1,4-phenylene, naphthalene-1,4-diyl or naphthalene-2,6-diyl, in which one or more CH groups in these groups are each optionally replaced by N, or cyclohexane-1,4-diyl, in which, in addition, one or more non-adjacent CH$_2$ groups are each optionally replaced by O and/or S, 1,4-cyclohexenylene, bicyclo[1.1.1]pentane-1,3-diyl, bicyclo-[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, which in each case is unsubstituted or mono- or polysubstituted by L;

Z$^1$ is on each occurrence, identically or differently, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO— CH=CH—, CR$^O$R$^{OO}$ or a single bond;

m1 0, 1, 2, 3 or 4;

R* is in each case, independently of one another, P-Sp-, H, L or straight-chain or branched alkyl having 1 to 25 C atoms, in which, in addition, one or more non-adjacent CH$_2$ groups are each optionally replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms are each optionally replaced by F, Cl, Br, I, CN or P-Sp-;

Q is a k-valent chiral group, which is optionally mono- or polysubstituted by L;

k is 1, 2, 3, 4, 5 or 6; and

L is P-Sp-, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, unsubstituted silyl, silyl substituted by halogen, —CN, R$^O$, —OR$^O$, —CO—R$^O$, —CO—O—R$^O$, —O—CO—R$^O$ or —O—CO—O—R$^O$, unsubstituted aryl having 6 to 20 C atoms, aryl having 6 to 20 C atoms which is substituted by halogen, —CN, R$^O$, —OR$^O$, —CO—R$^O$, —CO—O—R$^O$, —O—CO—R$^O$ or —O—CO—O—R$^O$, or straight-chain or branched alkyl, alkoxy, alkylcarbonyl, alkoxycarbonyl, alkylcarbonyloxy, or alkoxycarbonyloxy having 1 to 25 C atoms and, in which one or more H atoms are each optionally replaced by F, Cl or P-Sp-;

where the compounds contain at least one radical R* or L which is or contains a group P-Sp-.

17. A liquid-crystal display according to claim 16, wherein Q is of formula III:

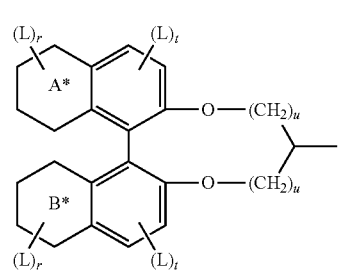    III wherein

A* and B* are each, independently of one another, fused benzene, cyclohexane or cyclohexene, r is 0, 1, 2, 3 or 4, t on each occurrence, identically or differently, is 0, 1 or 2, and u on each occurrence, identically or differently, is 0, 1 or 2.

18. A liquid-crystal display according to claim 16, wherein Q is of formula IV:

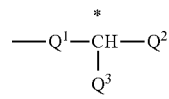

IV wherein
Q¹ is alkylene or alkyleneoxy having 1 to 9 C atoms or a single bond,
Q² is optionally fluorinated alkyl or alkoxy having 1 to 10 C atoms, in which, in addition, one or two non-adjacent CH₂ groups are each optionally replaced by —O—, —S—, —CH=CH—, —CO—, —OCO—, —COO—, —O—COO—, —S—CO—, —CO—S— or —C≡C— in such a way that O and/or S atoms are not linked directly to one another, and
Q³ is F, Cl, CN, optionally fluorinated alkyl or alkoxy having 1 to 10 C atoms, in which, in addition, one or two non-adjacent CH₂ groups are each optionally replaced by —O—, —S—, —CH=CH—, —CO—, —OCO—, —COO—, —O—COO—, —S—CO—, —CO—S— or —C≡C— in such a way that O and/or S atoms are not linked directly to one another,
wherein Q³ is different from Q².

19. A liquid-crystal display according to claim 14, wherein L is F, Cl, Br, I, —CN, —NO₂, —NCO, —NCS, —OCN, —SCN, —C(=O)N(Rˣ)₂, —C(=O)Y¹, —C(=O)Rˣ, —N(Rˣ)₂.

20. A liquid-crystal display according to claim 14, wherein L is F, Cl, CN, NO₂, CH₃, C₂H₅, OCH₃, OC₂H₅, COCH₃, COC₂H₅, COOCH₃, COOC₂H₅, CF₃, OCF₃, OCHF₂, OC₂F₅, or phenyl.

21. A liquid-crystal display according to claim 14, wherein Sp is Sp'-X';
Sp' is alkylene having 1 to 20 C atoms, which is optionally mono- or polysubstituted by F, Cl, Br, I or CN, and in which, in addition, one or more non-adjacent CH₂ groups are each optionally replaced, independently of one another, by —O—, —S—, —NH—, —NR⁰—, —SiR⁰R⁰⁰—, —CO—, —COO—, —OCO—, —OCO—O—, —S—CO—, —CO—S—, —NR⁰—CO—O—, —O—CO—NR⁰—, —NR⁰—CO—NR⁰—, —CH=CH— or —C≡C— in such a way that O and/or S atoms are not linked directly to one another,
X' is —O—, —S—, —CO—, —COO—, —OCO—, —O—COO—, —CO—NR⁰—, —NR⁰—CO—, —NR⁰—CO—NR⁰—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰—, —CY²=CY³—, —C≡C—, —CH=CH—COO—, —OCO—CH=CH— or a single bond,
R⁰ and R⁰⁰ are each, independently of one another, H or alkyl having 1 to 12 C atoms, and
Y² and Y³ are each, independently of one another, H, F, Cl or CN.

22. A liquid-crystal display according to claim 21, wherein X' is —O—, —S—, —CO—, —COO—, —OCO—, —O—COO—, —CO—NR⁰—, —NR⁰—CO—, —NR⁰—CO—NR⁰— or a single bond;
Sp' is —(CH₂)_{p1}—, —(CH₂CH₂O)_{q1}—CH₂CH₂—, —CH₂CH₂—S—CH₂CH₂—, —CH₂CH₂—NH—CH₂CH₂— or —(SiR⁰R⁰⁰—O)_{p1}—,
p1 is an integer from 1 to 12, and
q1 is an integer from 1 to 3.

23. A liquid-crystal display according to claim 22, wherein —X'-Sp'- is —(CH₂)_{p1}—, —O—(CH₂)_{p1}—, —OCO—(CH₂)_{p1}—, or —OCOO—(CH₂)_{p1}—.

24. A liquid-crystal display according to claim 5, wherein L is P-Sp-, F, Cl, Br, I, —CN, —NO₂, —NCO, —NCS, —OCN, —SCN, —C(=O)N(Rˣ)₂, —C(=O)Y¹, —C(=O)Rˣ, —N(Rˣ)₂, unsubstituted silyl, silyl substituted by halogen, —CN, R⁰, —OR⁰, —CO—R⁰, —CO—O—R⁰, —O—CO—R⁰ or —O—CO—O—R⁰, unsubstituted aryl having 6 to 20 C atoms, aryl having 6 to 20 C atoms which is substituted by halogen, —CN, R⁰, —OR⁰, —CO—R⁰, —CO—O—R⁰, —O—CO—R⁰ or —O—CO—O—R⁰, or straight-chain or branched alkyl, alkoxy, alkylcarbonyl, alkoxycarbonyl, alkylcarbonyloxy, or alkoxycarbonyloxy having 1 to 25 C atoms and, in which one or more H atoms are each optionally replaced by F, Cl or P-Sp-, and
Rˣ is P-Sp-, H, halogen, or straight-chain, branched or cyclic alkyl having 1 to 25 C atoms wherein one or more non-adjacent CH₂ groups are each optionally replaced by —O—, —S—, —CO—, —CO—O—, —O—CO—, —O—CO—O— in such a way that O and/or S atoms are not linked directly to one another, and wherein one or more H atoms are each optionally replaced by F, Cl or P-Sp-.

25. A liquid-crystal display according to claim 6, wherein R is P-Sp-, H, halogen, or straight-chain, branched or cyclic alkyl having 1 to 25 C atoms wherein one or more non-adjacent CH₂ groups are each optionally replaced by —O—, —S—, —CO—, —CO—O—, —O—CO—, —O—CO—O— in such a way that O and/or S atoms are not linked directly to one another, and wherein one or more H atoms are each optionally replaced by F, Cl or P-Sp-.

* * * * *